US012560719B2

(12) United States Patent
Nehmadi et al.

(10) Patent No.:    US 12,560,719 B2
(45) Date of Patent:       Feb. 24, 2026

(54) AUTONOMOUS VEHICLE ENVIRONMENTAL PERCEPTION SOFTWARE ARCHITECTURE

(71) Applicant: VayaVision Sensing Ltd., Or Yehuda (IL)

(72) Inventors: Youval Nehmadi, Nili (IL); Pierre Olivier, Lévis (CA); Ido Goren, Herzelia (IL); Yoni Moskovich, Raanana (IL); Nir Darshan, Alfei Menashe (IL)

( * ) Notice:     Subject to any disclaimer, the term of this patent is extended or adjusted under 35 U.S.C. 154(b) by 348 days.

(21) Appl. No.:   17/776,928

(22) PCT Filed:    Nov. 13, 2020

(86) PCT No.:      PCT/CA2020/051558
§ 371 (c)(1),
(2) Date:       May 13, 2022

(87) PCT Pub. No.: WO2021/092702
PCT Pub. Date: May 20, 2021

(65)              Prior Publication Data
US 2022/0398851 A1      Dec. 15, 2022

Related U.S. Application Data

(60) Provisional application No. 62/934,623, filed on Nov. 13, 2019.

(51) Int. Cl.
G01S 7/40          (2006.01)
B60W 40/02        (2006.01)
(Continued)

(52) U.S. Cl.
CPC .............. G01S 17/89 (2013.01); G06F 18/25 (2023.01); G06V 20/58 (2022.01); B60W 60/001 (2020.02);
(Continued)

(58) Field of Classification Search
CPC .......... G01S 17/89; G01S 7/40; G01S 7/4808; G01S 7/417; G01S 13/865; G01S 13/867;
(Continued)

(56)                 References Cited

U.S. PATENT DOCUMENTS 10,024,965  B2     7/2018  Nehmadi et al.
10,444,357  B2    10/2019  Nehmadi et al.
(Continued)

FOREIGN PATENT DOCUMENTS

CN         109556615  A      4/2019
CN         115668182  A      1/2023
(Continued)

OTHER PUBLICATIONS

Chung, Sensor Data Acquisition and Multimodal Sensor Fusion for Human Activity Recognition Using Deep Learning, Sensors 2019, 19, 1716; doi:10.3390/s19071716, Apr. 10, 2019 (Year: 2019).*
(Continued)

*Primary Examiner* — Vu Le
*Assistant Examiner* — Lei Zhao
(74) *Attorney, Agent, or Firm* — Fish & Richardson P.C.

(57)                  ABSTRACT

A process for sensing a scene. The process includes receiving sensor data from a plurality of sensor modalities, where each sensor modality observes at least a portion of the scene containing at least one of the objects of interest and generates sensor data conveying information on the scene and of the object of interest. The process further includes processing the sensor data from each sensor modality to detect objects of interest and produce a plurality of primary detection results, each detection result being associated with a respective sensor modality. The process also includes fusing sensor data from a first sensor modality with sensor data from a second sensor modality to generate a fused 3D map of the scene, processing the fused 3D map to detect objects
(Continued)

Top-level system design of interest and produce secondary detection results and performing object level fusion on the primary and the secondary detection results.

34 Claims, 20 Drawing Sheets

(51) Int. Cl.

| | |
|---|---|
| *G01S 13/89* | (2006.01) |
| *G01S 13/931* | (2020.01) |
| *G01S 17/86* | (2020.01) |
| *G01S 17/87* | (2020.01) |
| *G01S 17/89* | (2020.01) |
| *G01S 17/894* | (2020.01) |
| *G01S 17/931* | (2020.01) |
| *G06F 18/25* | (2023.01) |
| *G06V 10/94* | (2022.01) |
| *G06V 20/58* | (2022.01) |
| *B60W 60/00* | (2020.01) |

(52) U.S. Cl.
CPC . *B60W 2420/403* (2013.01); *B60W 2420/408* (2024.01)

(58) Field of Classification Search
CPC ........ G01S 13/89; G01S 13/931; G01S 17/86; G01S 17/931; G01S 17/87; G01S 17/894; G06F 18/25; G06F 18/251; G06V 20/58; G06V 10/803; G06V 10/94; B60W 60/001; B60W 2420/403; B60W 2420/408; B60W 40/02; B60W 2554/40; B60W 2556/35
See application file for complete search history.

(56) References Cited

U.S. PATENT DOCUMENTS

| | | | | |
|---|---|---|---|---|
| 10,445,928 | B2 | 10/2019 | Nehmadi et al. | |
| 2014/0118716 | A1 | 5/2014 | Kaganovich et al. | |
| 2014/0368615 | A1* | 12/2014 | van Baar | G01S 17/894 |
| | | | | 382/154 |
| 2016/0291154 | A1 | 10/2016 | Nehmadi et al. | |
| 2017/0080950 | A1 | 3/2017 | Pink et al. | |
| 2017/0200273 | A1 | 7/2017 | Kamilov et al. | |
| 2018/0068206 | A1* | 3/2018 | Pollach | G06V 20/56 |
| 2018/0149732 | A1 | 5/2018 | Droz et al. | |
| 2018/0232947 | A1 | 8/2018 | Nehmadi et al. | |
| 2018/0315240 | A1 | 11/2018 | Yoshida et al. | |
| 2019/0086539 | A1 | 3/2019 | Shin et al. | |
| 2019/0228647 | A1 | 7/2019 | Conde et al. | |

FOREIGN PATENT DOCUMENTS

| | | | | |
|---|---|---|---|---|
| HK | 40087828 | A | 9/2023 | |
| JP | 5451749 | B2 * | 3/2014 | ............. G03B 17/20 |
| JP | 2017-513162 | A | 5/2017 | |
| JP | WO 2017/085857 | A1 | 11/2017 | |
| JP | 2023501812 | A | 1/2023 | |
| WO | WO 2009/083854 | | 7/2009 | |
| WO | WO-2017122529 | A1 * | 7/2017 | ........... G01S 13/867 |
| WO | WO-2018224874 | A1 * | 12/2018 | ........... G05D 1/0088 |
| WO | WO 2021/092702 | A1 | 5/2021 | |

OTHER PUBLICATIONS

Communication of European publication number and information on the application of Article 67(3) EPC issued on Aug. 24, 2022 in connection with EP Patent Application No. 20887318.2, 1 page.
International Preliminary Report on Patentability issued May 17, 2022 in connection with International Application No. PCT/CA2020/051558, 21 pages.
International Search Report and Written Opinion issued by the International Searching Authority on Feb. 4, 2021 in connection with International Application No. PCT/CA2020/051558, 26 pages.
Sistu, G. et al. "NeurAll: Towards a Unified Visual Perception Model for Automated Driving", Computer Vision and Pattern Recognition, arXiv, Feb. 10, 2019 (Feb. 10, 2019) https://arxiv.org/abs/1902.03589, 8 pages.
European Search Report and search opinion issued in connection with EP Patent Application No. 20887318.2 on Jan. 30, 2024, 15 pages.
Examiner's Report issued by the Canadian Intellectual Property Office on Nov. 29, 2023 in connection with Canadian Patent Application No. 3161616, 6 pages.
Office Action issued in connection with JP Patent Application No. 2022-528354 on Oct. 21, 2024, 6 pages.
Partial European Search Report and provisional opinion accompanying the partial search results issued in connection with EP Patent Application No. 20887318.2 on Nov. 8, 2023, 13 pages.
Office Action issued in connection with CN Patent Application No. 2020800897241 on Jan. 9, 2025, 11 pages.
Office Action issued in connection with JP Patent Application No. 2022-528354 on Feb. 25, 2025, 4 pages.

* cited by examiner

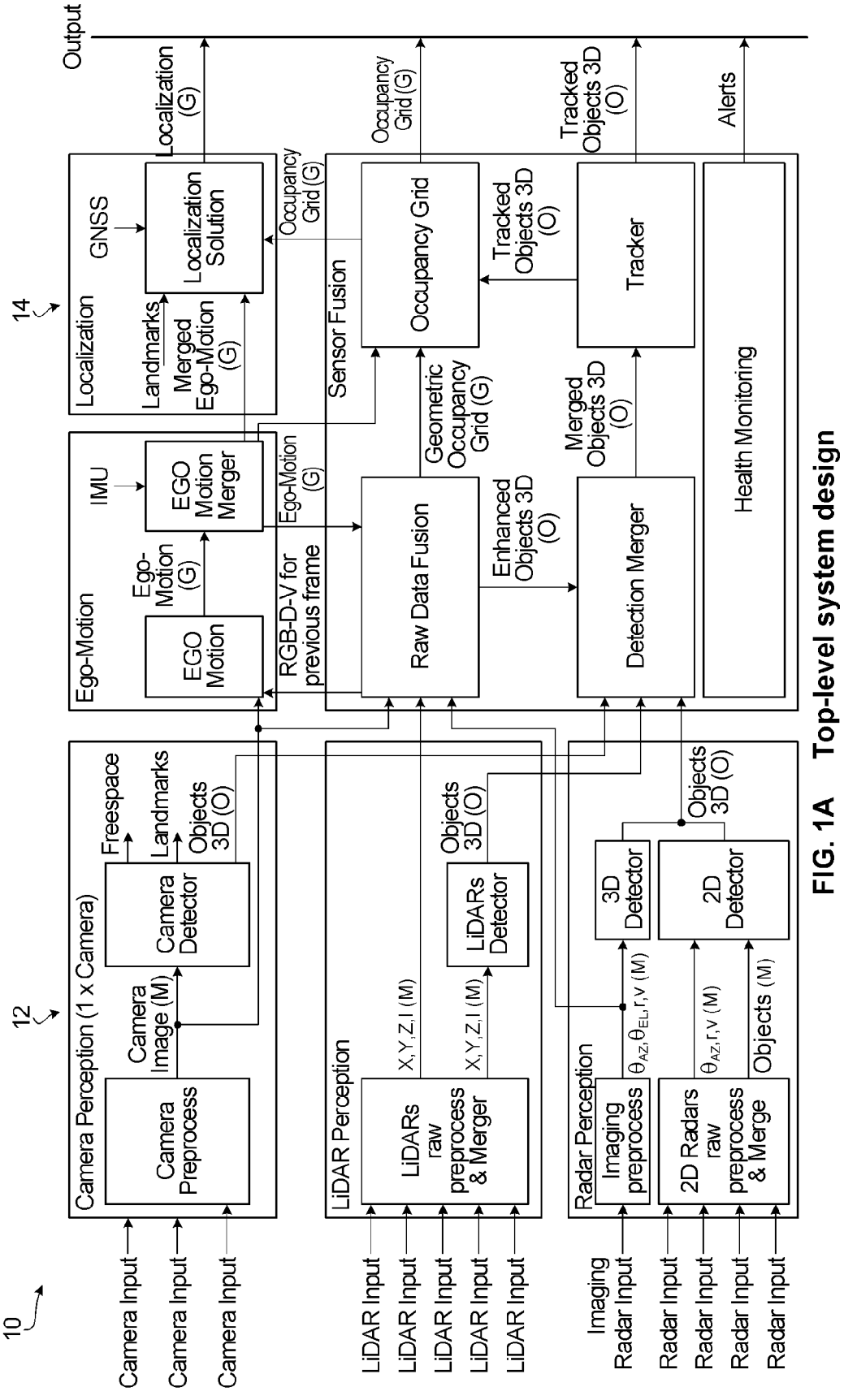
FIG. 1A    Top-level system design

16
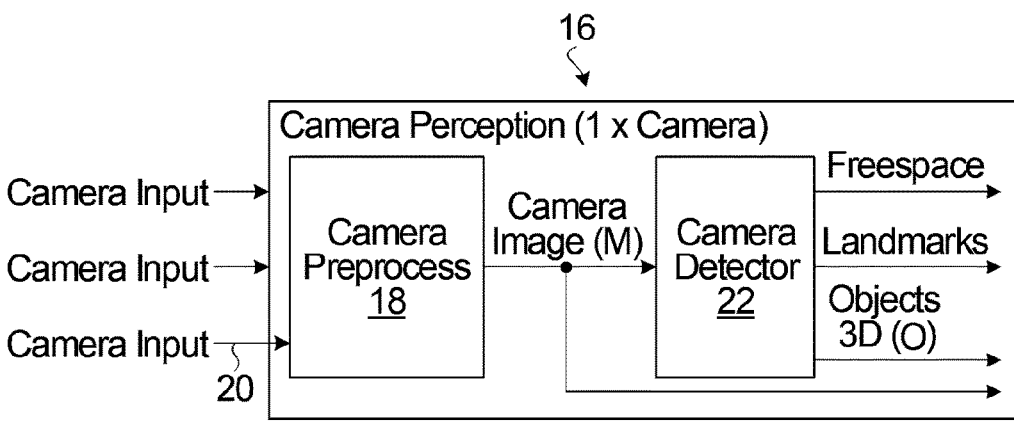
FIG. 2   Camera Perception Module
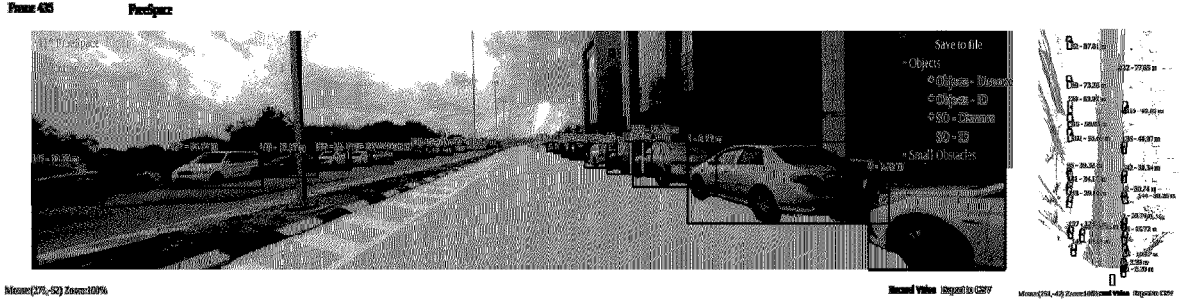
*FIG. 3 - Sample Camera Perception Results (2D + BEV)*
24
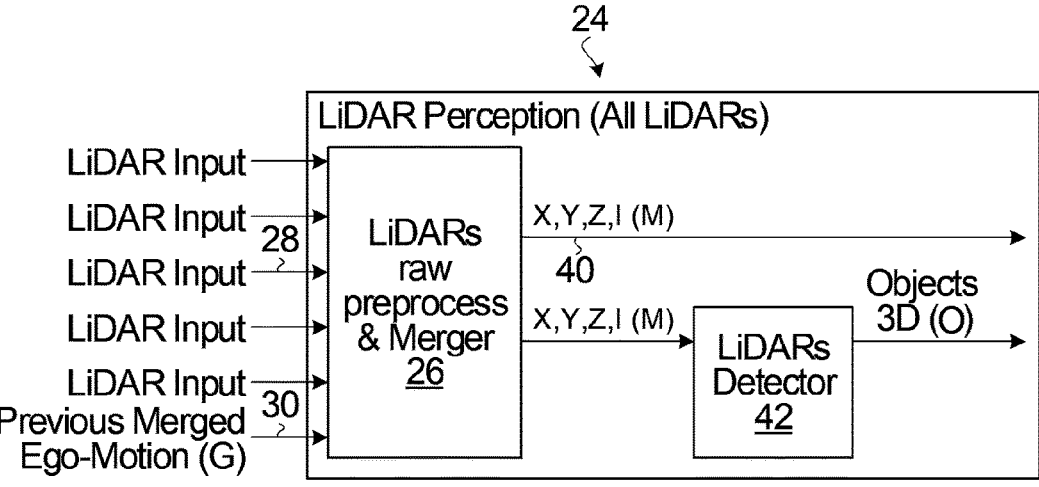
FIG. 4A   LiDAR Perception Module

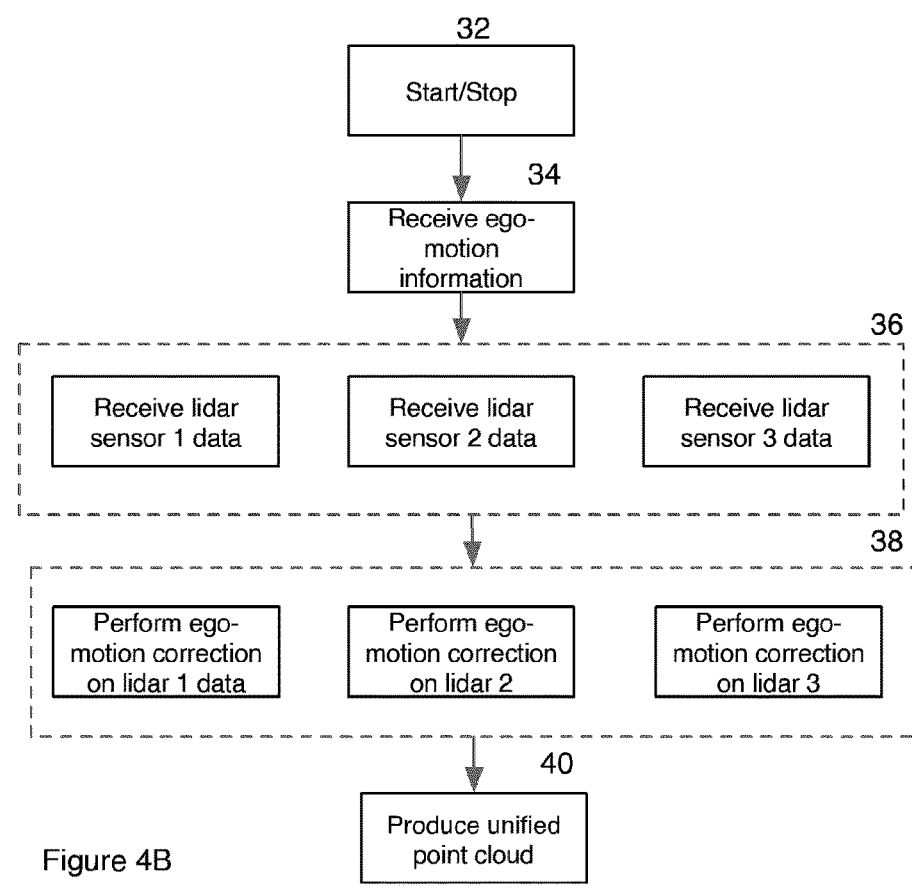
Figure 4B
FIG. 5 - Sample Output for LiDAR Perception (3D + BEV)
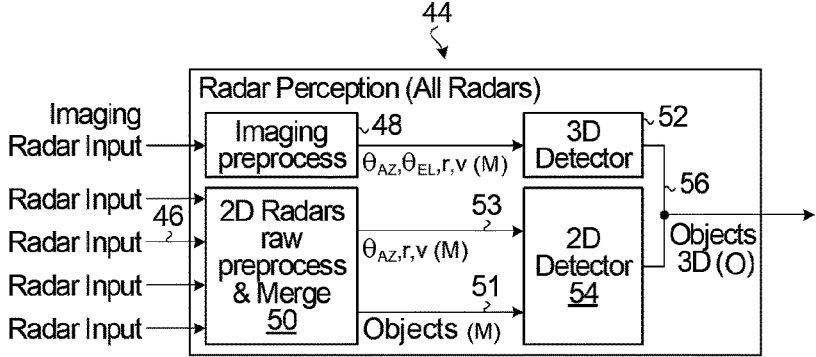
FIG. 6   Radar Perception Module

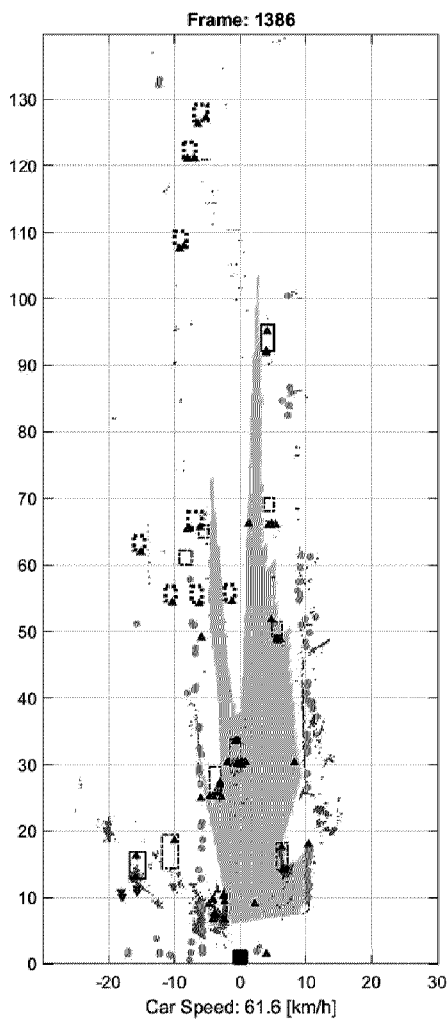
FIG. 7 - Image of radar, using clusters to detect single truck
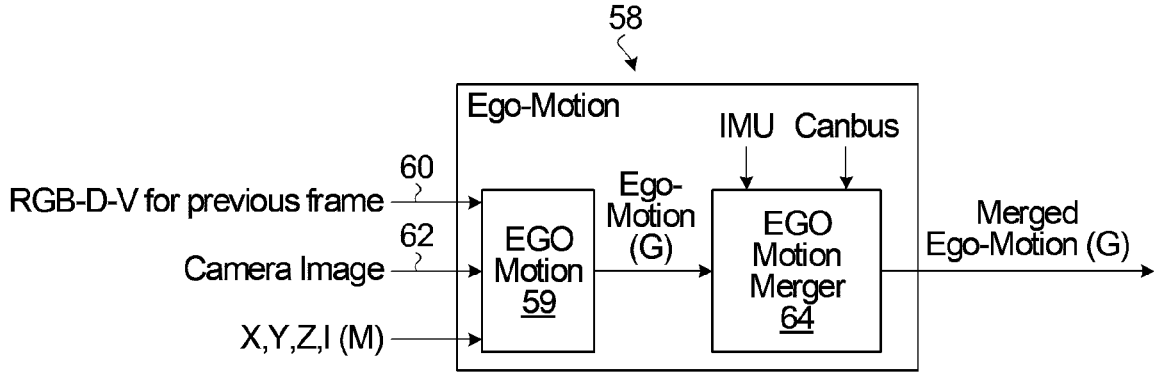
FIG. 8A   Ego-Motion Module

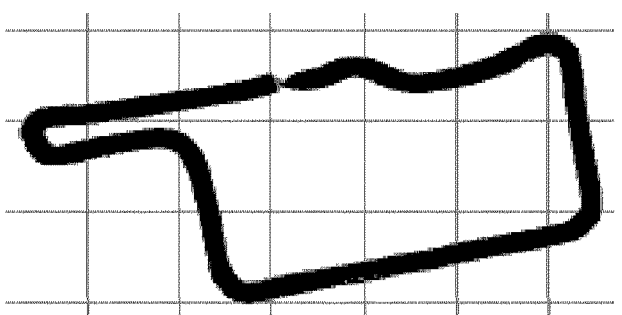
FIG. 9 – Sample Ego-Motion in Or-Yehuda
FIG. 10 - Image of Ego-Motion key points connection between 2 images:
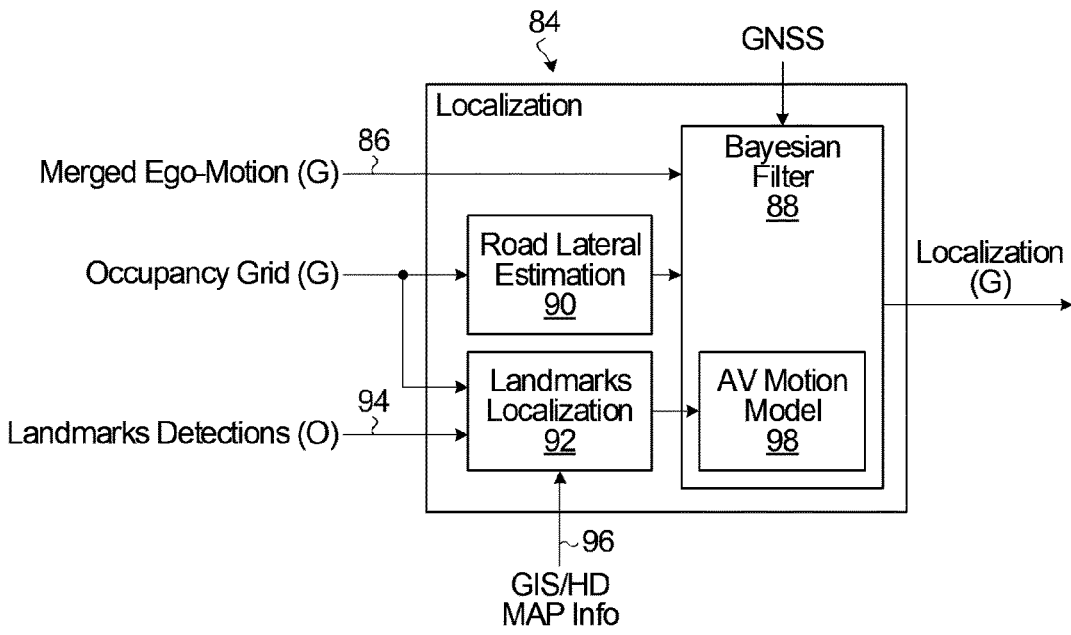
FIG. 11    Localization Module

FIG. 12 - Image of basic localization from BEV (blue – Ego-Motion, pink – GNSS as Ground Truth)
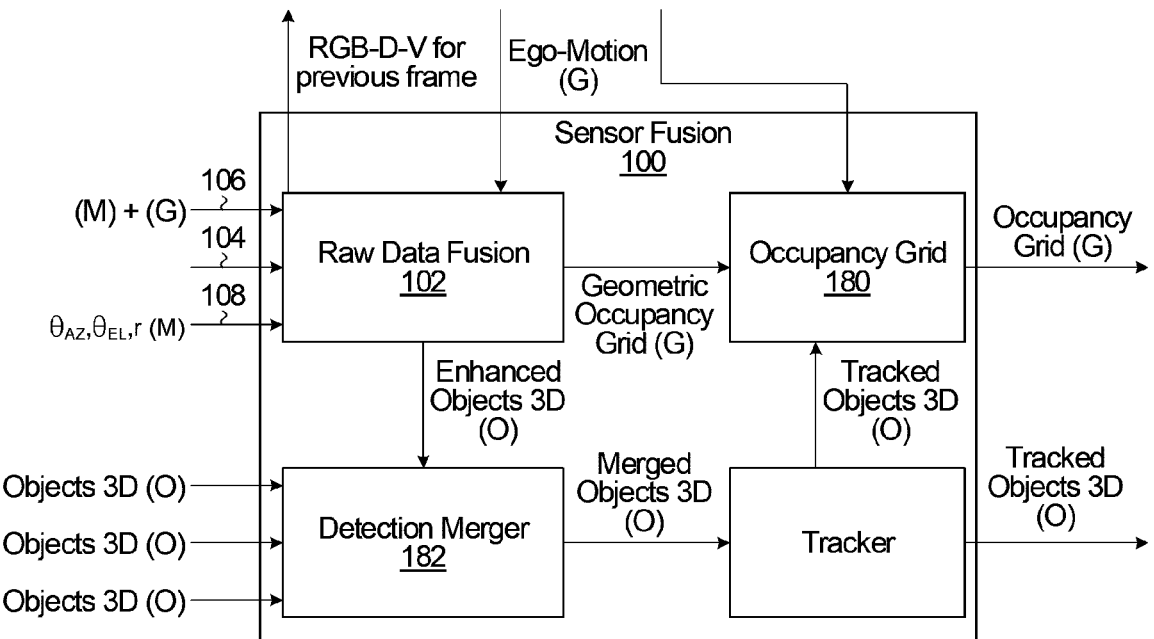
FIG. 13    Sensor Fusion Module
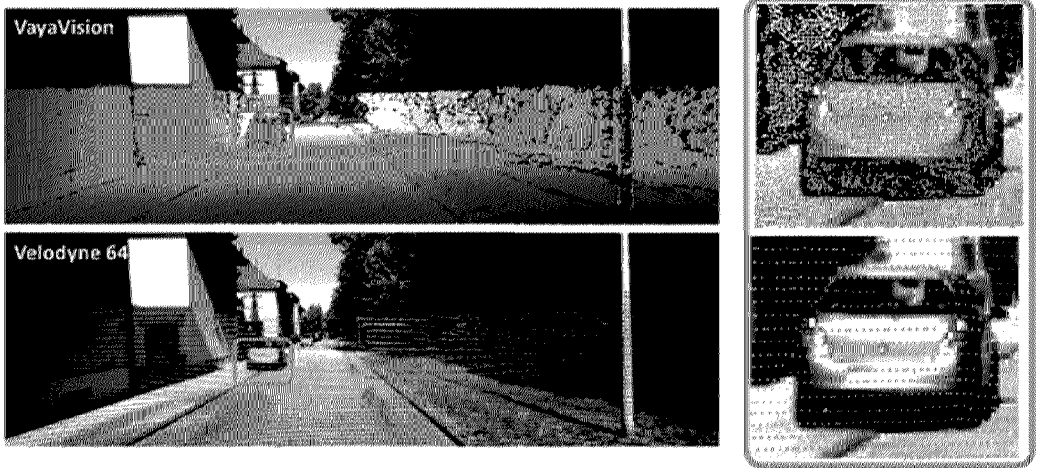
FIG. 14 - Velodyne 64 LiDAR depth map vs VayaVision's 3D-reconstruction depth map

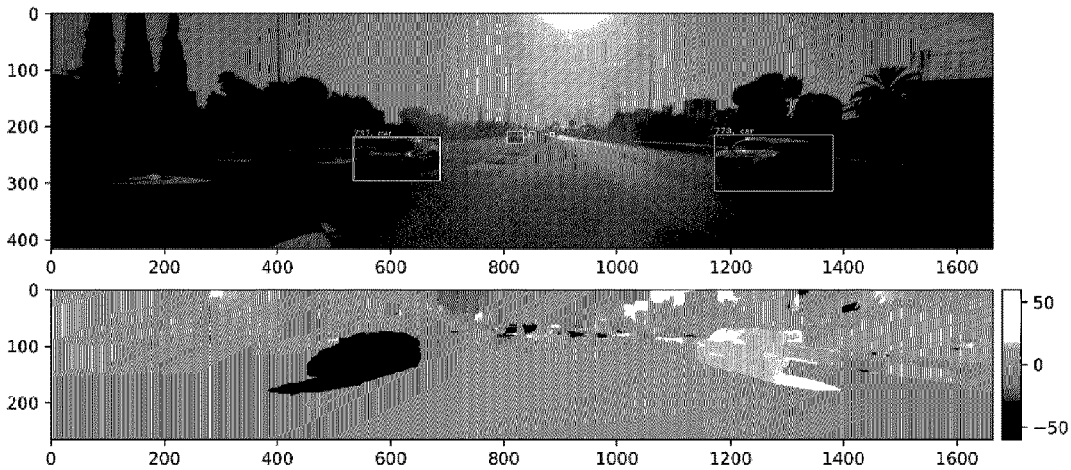
FIG. 15 – Example of Velocity from the RGB-D-V model
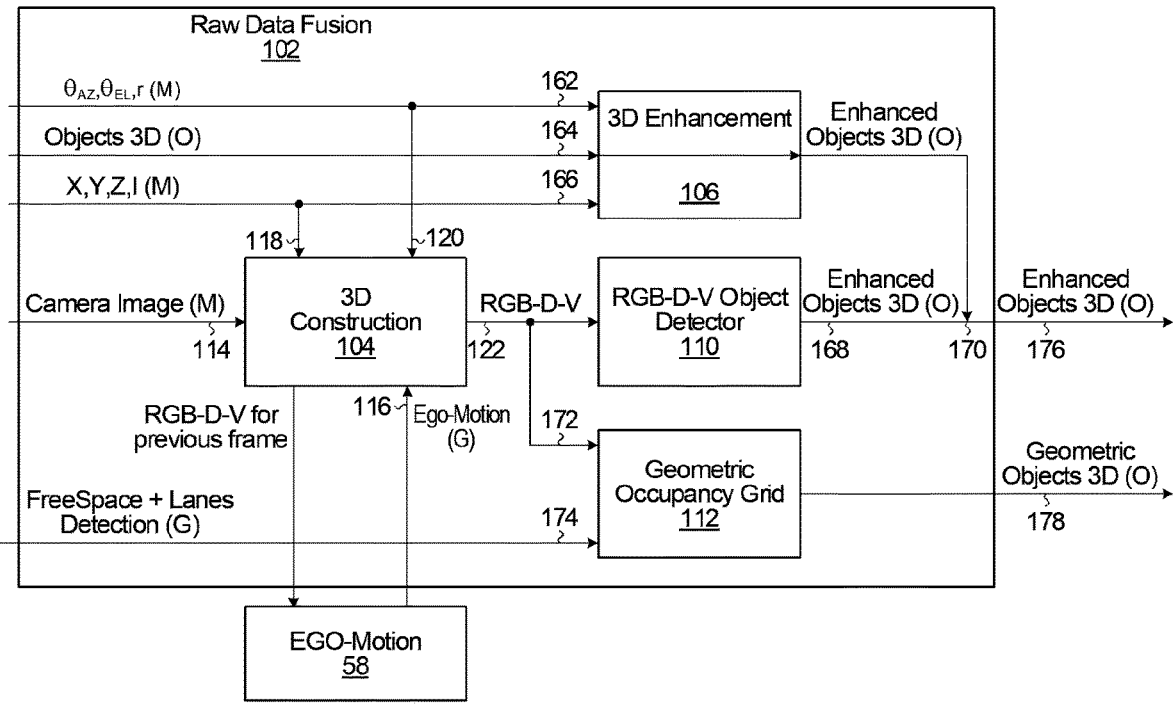
FIG. 16A    The Raw Data Module

Lidar type A
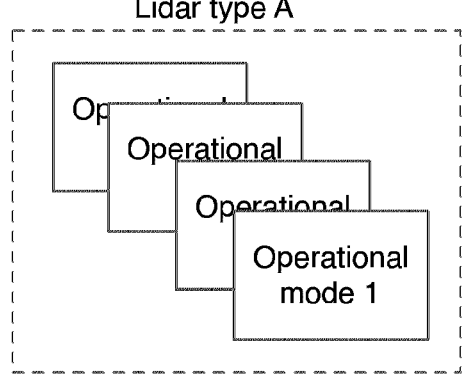
Lidar type B
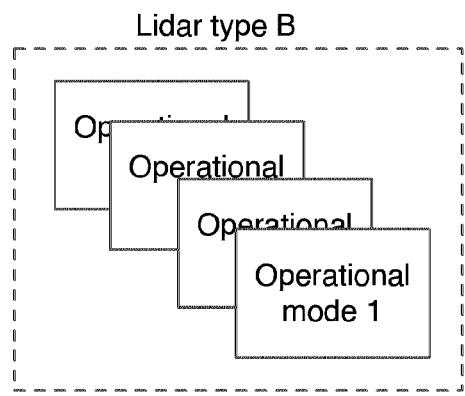
Lidar type C
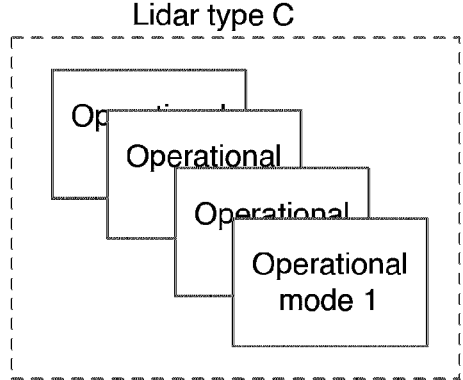
Lidar type D
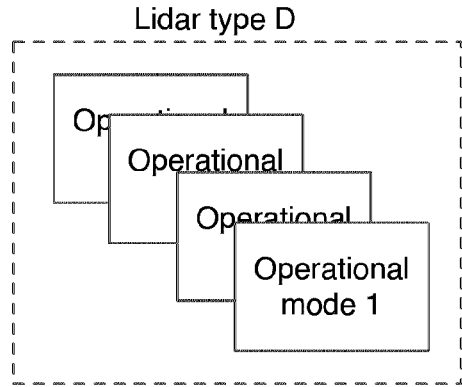
Figure 16C

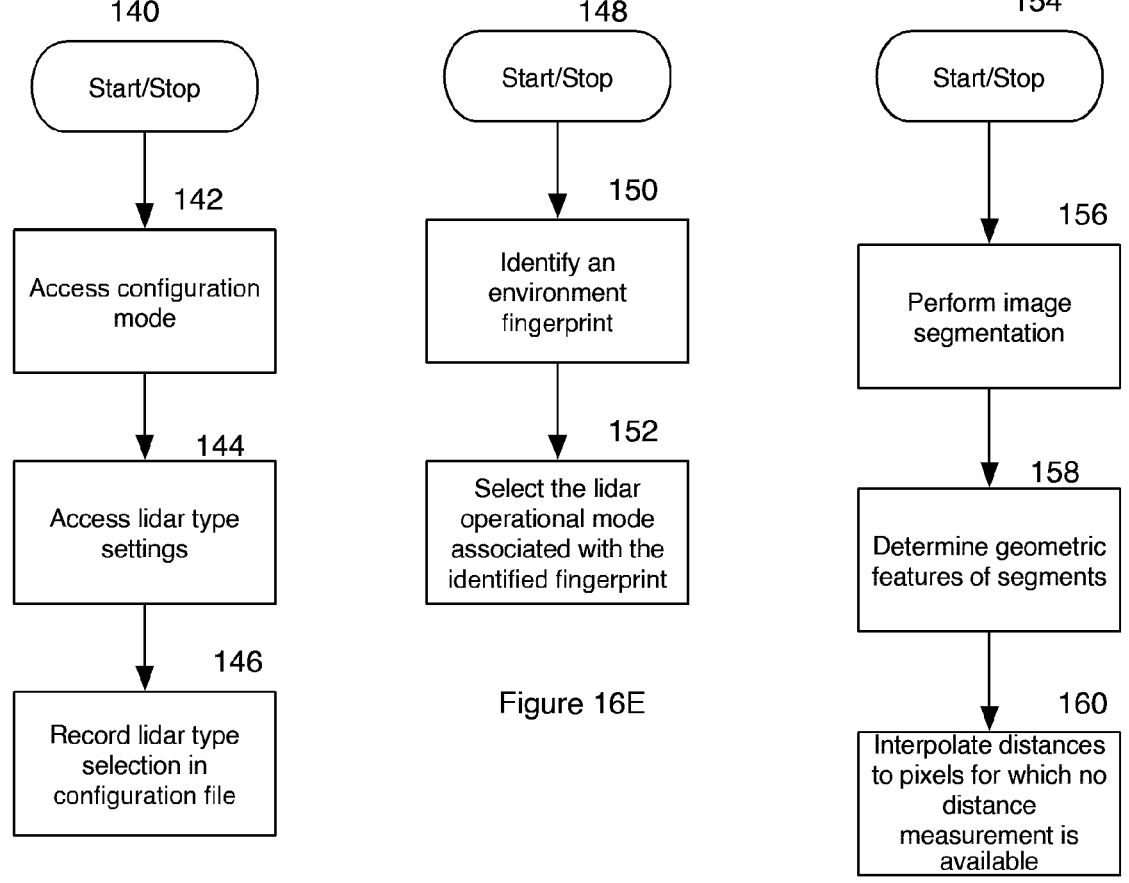

140

Start/Stop

142

Access configuration mode

144

Access lidar type settings

146

Record lidar type selection in configuration file

Start/Stop

150

Identify an environment fingerprint

152

Select the lidar operational mode associated with the identified fingerprint

Start/Stop

156

Perform image segmentation

158

Determine geometric features of segments

160

Interpolate distances to pixels for which no distance measurement is available

Figure 16F

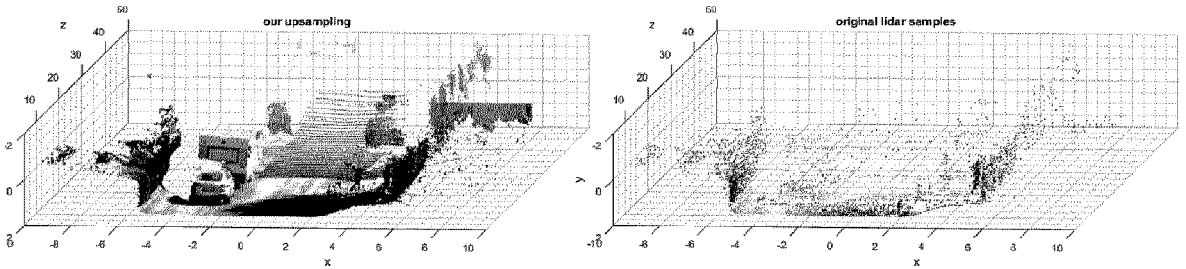
FIG. 17 – 3D-reconstruction example
FIG. 18 - 3D detection and enhancement (Camera view)

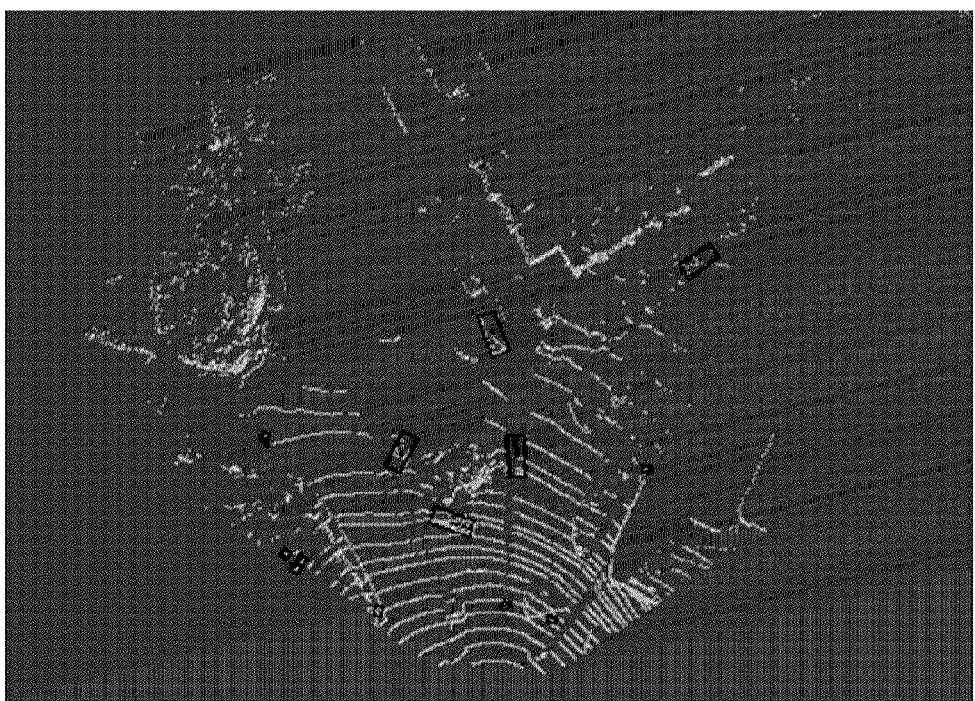
FIG. 19- 3D detection and enhancement (BEV)
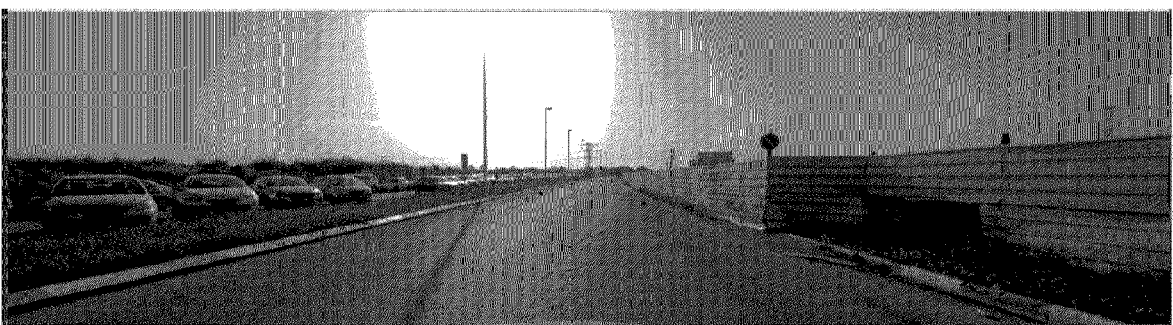
FIG. 20 – Small obstacle (Original)
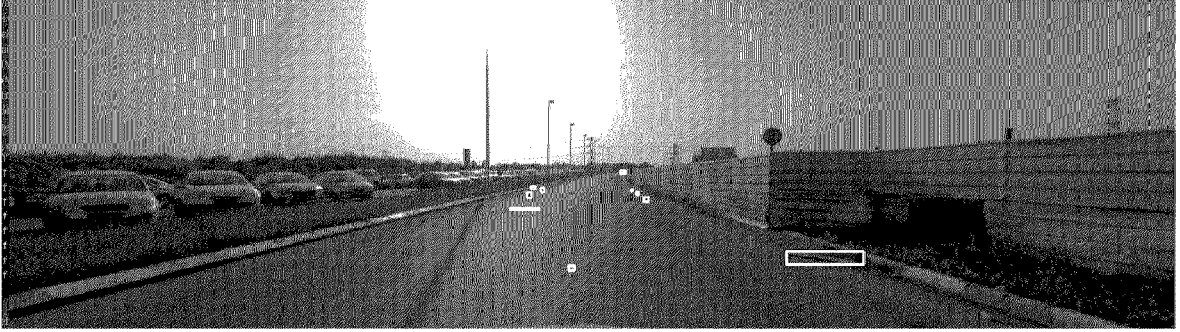
FIG. 21 - Small Obstacle Detections

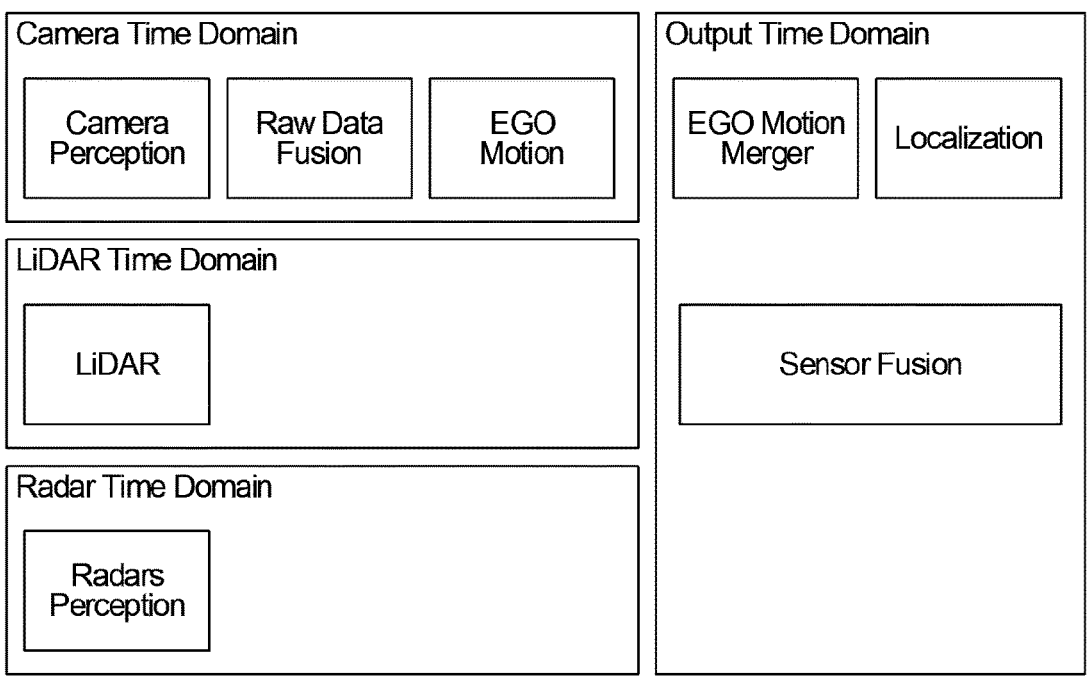
FIG. 22   Main software modules and the operational time domain
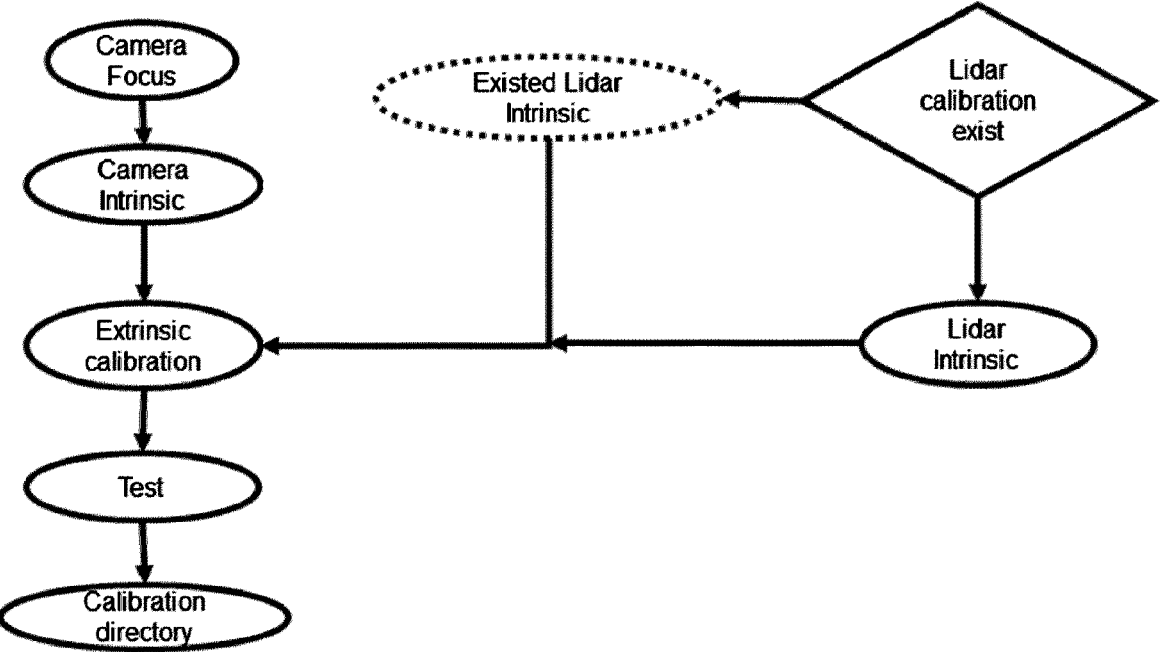
FIG. 23 - Example of a process to reach an accurate calibration

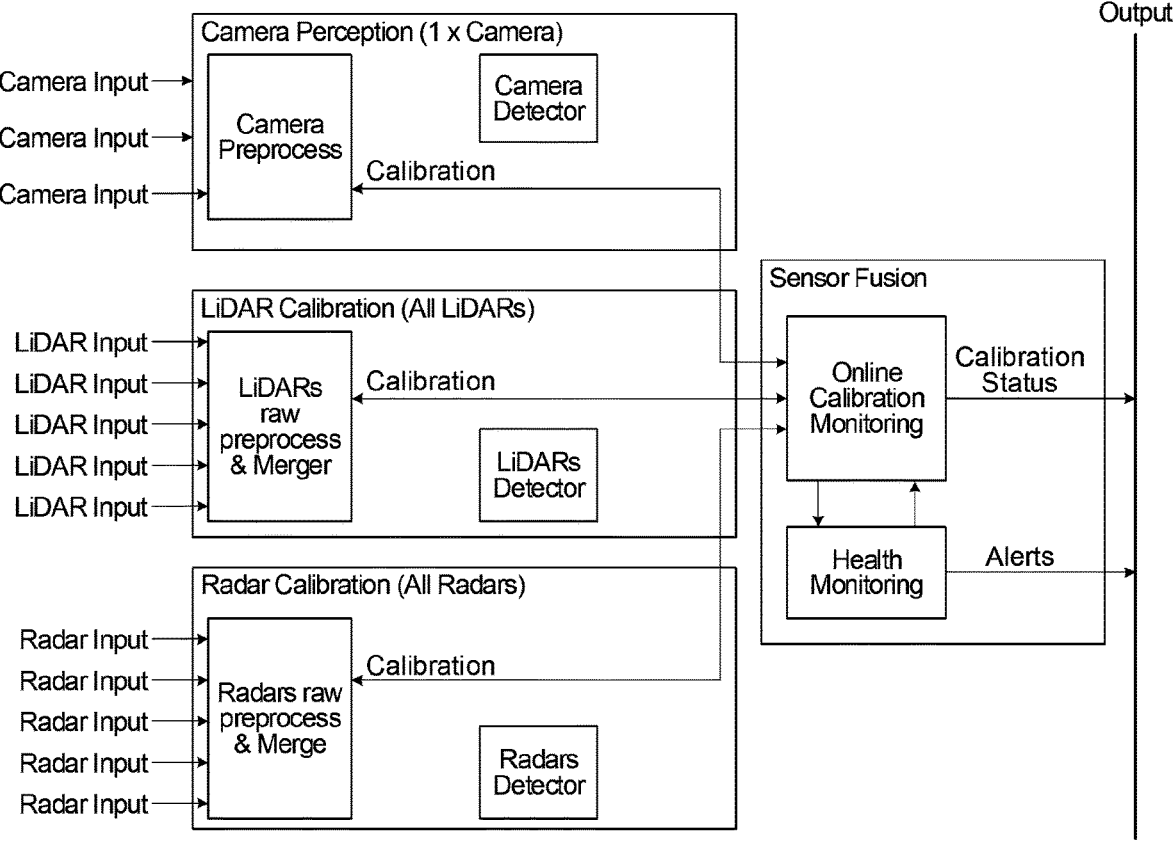
FIG. 24   Calibration Module
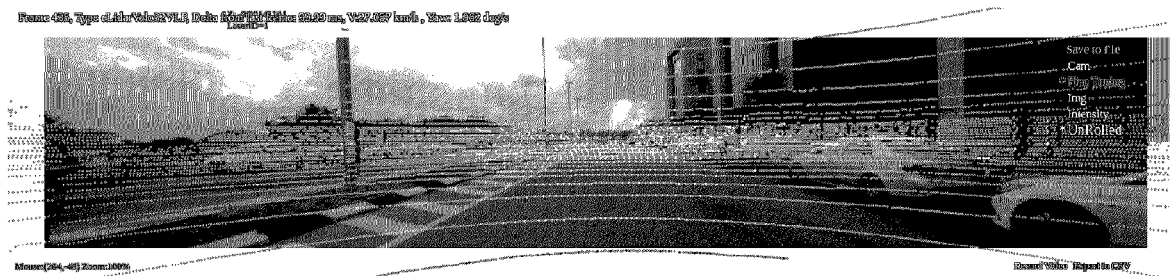
FIG.  25 – Example of calibration between LiDAR point cloud and image

FIG. 26 – Sample calibration on targets
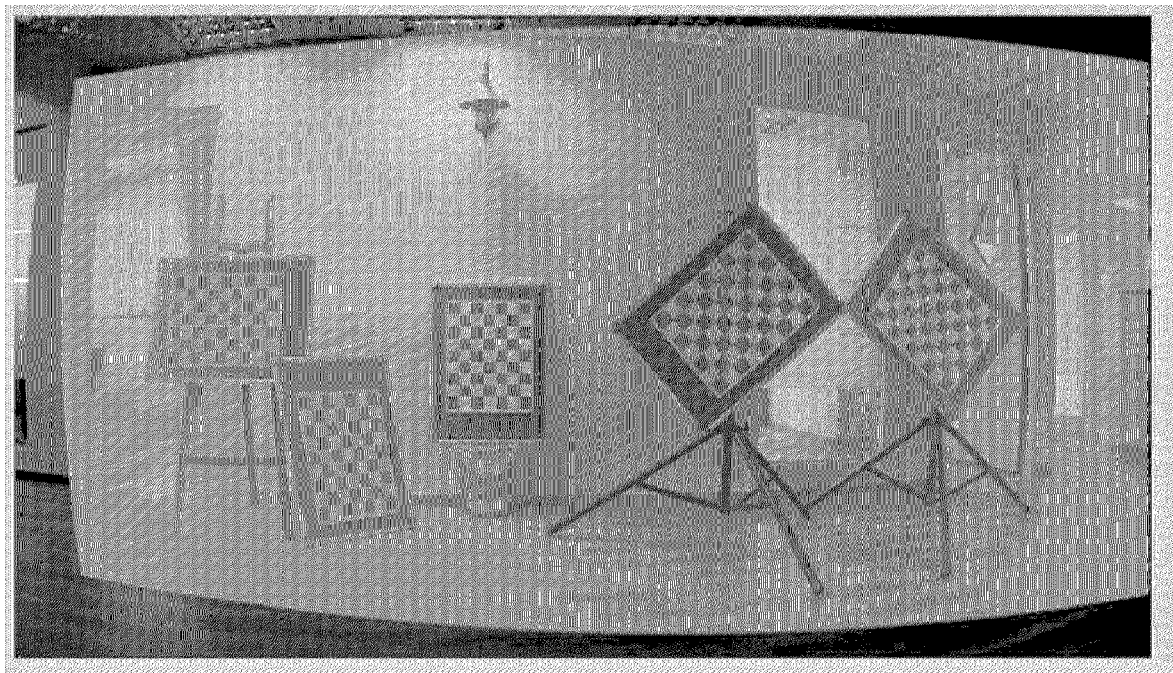
FIG. 27 – Another example of calibration on targets

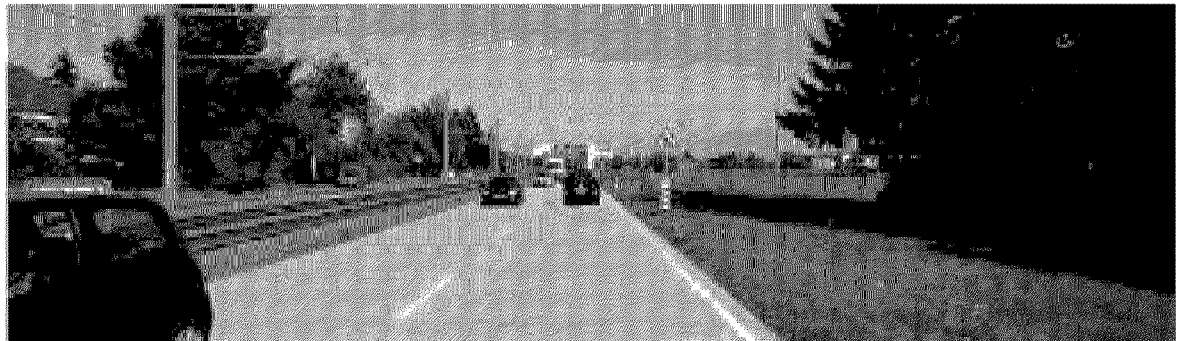
FIG. 28   - Sample Free Space Detection
FIG. 29   – Sample Road & Lanes Detection

Occupancy Grid: a Bird's eye view of the road and surroundings that enables the path planning to find an optimal path for the vehicle. This includes merged data of free space, objects, trajectories and so forth.

Color code:
▨ Freespace (green)
☆ Obstacle (red)
○ Static radar target (magenta circles)
△ Dynamic radar target (blue triangles)
   Unknown (white)

Bounding box code:
▢ Radar+obstacles (full border)
▢ Camera only detection (dash-dot border)
▢ Radar only (thick dashed border)

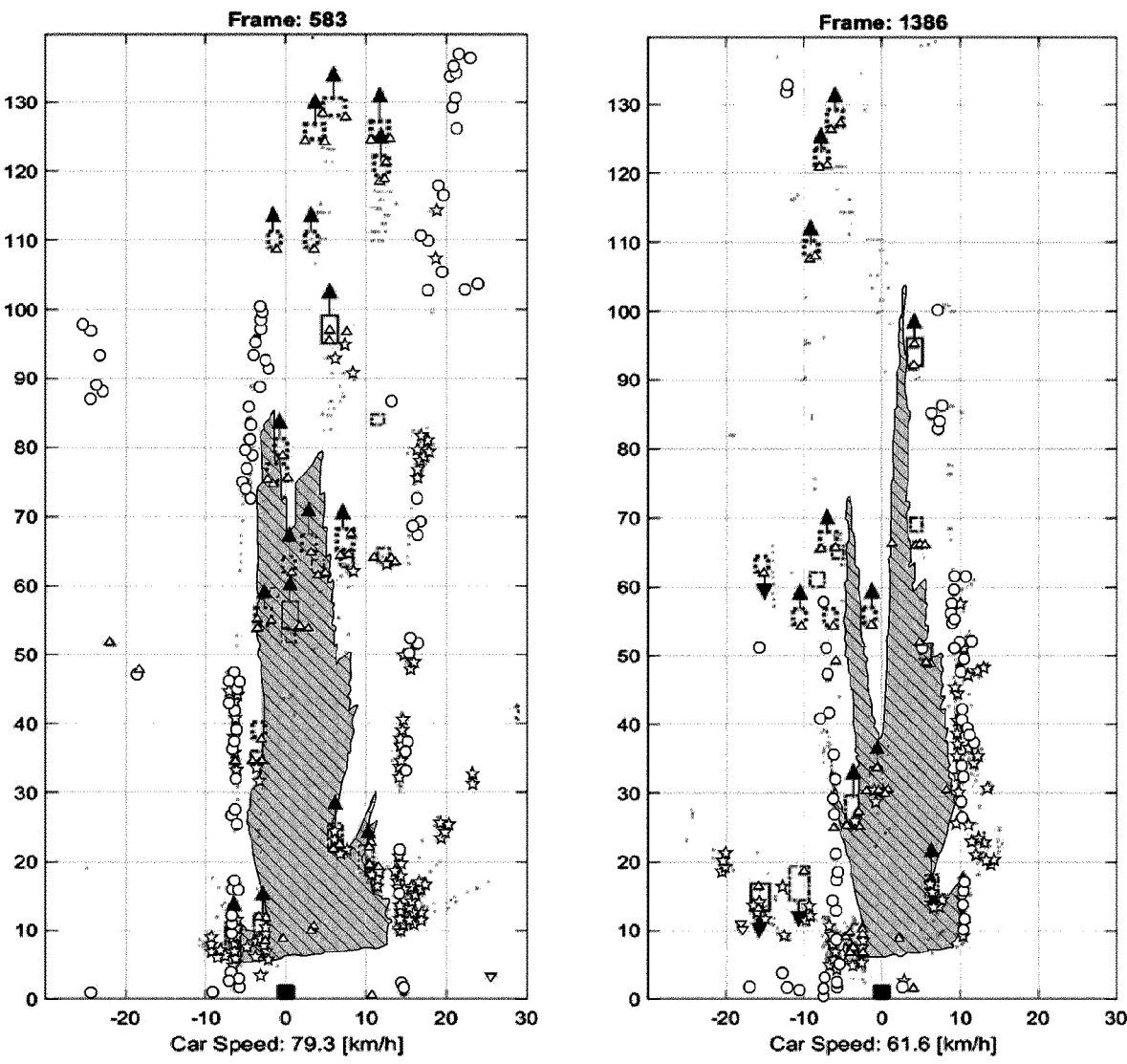

FIG. 30 - Two Samples of Occupancy Grids

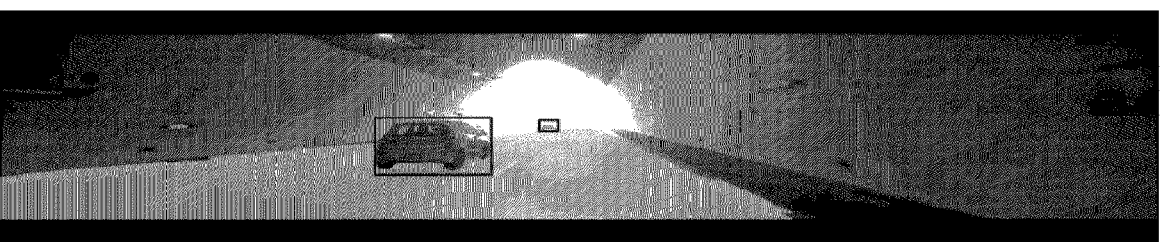
FIG. 31 Corner Cases: Tunnel
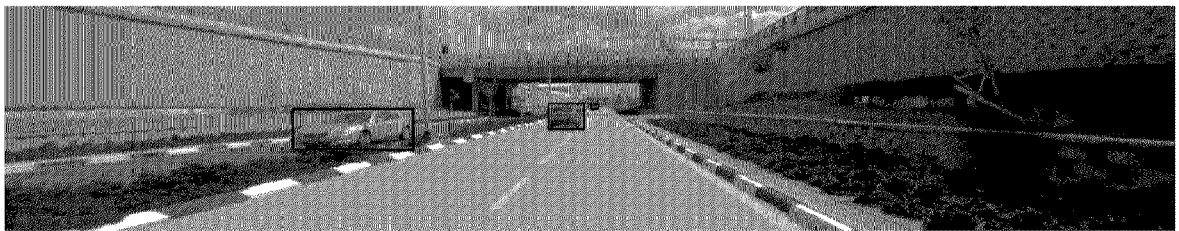
FIG. 32 – Corner Cases: Insects on glass
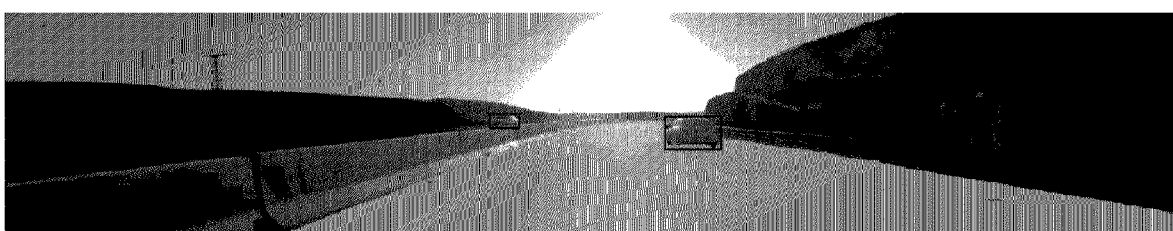
FIG. 33 - Corner Cases: Sunset
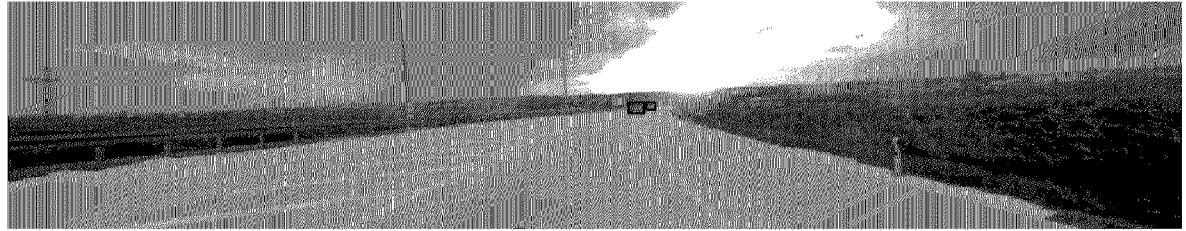
FIG. 34 - Corner Cases: Rain

AUTONOMOUS VEHICLE ENVIRONMENTAL PERCEPTION SOFTWARE ARCHITECTURE

CROSS-REFERENCE TO RELATED APPLICATIONS

The present application is the national stage entry of International Patent Application No. PCT/CA2020/051558, filed on Nov. 13, 2020, and which claims priority to U.S. Provisional Application No. 62/934,623, filed on Nov. 13, 2019, the disclosures of which are expressly incorporated herein in their entirety by reference thereto.

FIELD OF THE INVENTION

The invention relates to a computer-based architecture for performing environmental perception. In particular, the invention relates to hardware and software components for processing inputs from multiple sensors, for example sensors operating according to different modalities and developing from those inputs a perception of the environment, which can be used for path planning purposes in an autonomous vehicle or for other applications.

BACKGROUND OF THE INVENTION

The automotive industry is amid a disruptive change highlighted by the entry of autonomous vehicles as well as electrification and ride hailing. While autonomous driving has made considerable strides in these past few years, current solutions are still not safe enough nor are they sufficiently reliable for commercial deployment, except in the most limited scenarios.

Most current OEMs and Tier 1 car manufacturing vendors are still looking for the "ultimate" autonomous driving technology that can identify any object as viewed by human eyes, while sustaining a reasonable cost for sensors and for the processing unit. The ability to detect the dynamic driving environment, such as vehicles, pedestrians and small obstacles on the road, while maintaining the affordability of the car is a daunting task.

SUMMARY OF THE INVENTION

As embodied and broadly described herein, the invention provides a process for sensing a scene containing objects of interest. The process includes receiving sensor data from a plurality of sensor modalities, where each sensor modality observes at least a portion of the scene containing at least one of the objects of interest and generates sensor data conveying information on the portion of the scene and of the at least one object of interest. The process further includes processing the sensor data from each sensor modality to detect objects of interest and produce a plurality of primary detection results, each detection result being associated with a respective sensor modality The process also includes fusing sensor data derived from a first sensor modality with sensor data derived from a second sensor modality to generate a fused 3D map of the scene, processing the fused 3D map to detect objects of interest in the scene and produce secondary detection results and performing object level fusion on the primary and the secondary detection results.

As embodied and broadly described herein, the invention also includes a system having a plurality of sensor modules, each sensor module including a sensor operating according to a respective modality that is different from the modality of another sensor of a sensor module of the plurality of sensor modules, the sensor configured to observe at least a portion of a scene containing at least one of the objects of interest and generates sensor data conveying information on the portion of the scene and of the at least one object of interest, and a perception functional block for processing the sensor data to output primary detection results. The system further includes a sensor fusion module configured for fusing sensor data derived from a first sensor module operating according to a first sensor modality with sensor data derived from a second sensor module operating according to a second sensor modality to generate a fused 3D map of the scene, processing the fused 3D map to detect objects of interest in the scene and produce secondary detection results and performing object level fusion on the primary and the secondary detection results.

As embodied and broadly described herein, the invention further comprises system, including a plurality of sensor modules for sensing a scene containing objects of interest, each sensor module operating according to a respective sensor modality, each sensor module having a sensor input for receiving sensor data from a sensor of the respective modality, a software-based perception entity processing the sensor data to detect objects of interest in the sensor data and an output to produce sensor data derived from the sensor of the respective modality and primary detection results derived from the processing. The system further includes a software-based perception module, having an input to receive the sensor data from each sensor module, an input to receive the primary detection results from each sensor module and a processing entity to process the sensor data from two or more of the sensor modules and the primary detection results to derive secondary detection results.

As embodied and broadly described herein the invention further provides a process, including providing a plurality of sensor modules for sensing a scene containing objects of interest, each sensor module operating according to a respective sensor modality, each sensor module including a sensor input for receiving sensor data from a sensor of the respective modality and a software-based perception entity. The process further incudes processing the sensor data to detect objects of interest in the sensor data to produce sensor data derived from the sensor of the respective modality and primary detection results derived from the processing. The process also includes providing a software-based perception module, including an input to receive the sensor data from each sensor module, an input to receive the primary detection results from each sensor module and processing the sensor data from two or more of the sensor modules and the primary detection results to derive secondary detection results.

As embodied and broadly described herein the invention further comprises a system, comprising a plurality of sensor modules for sensing a scene containing objects of interest, each sensor module operating according to a respective sensor modality, a sensor fusion module for fusing detection results from the plurality of sensor modules into a unified perception solution, the fusing including determining sensor performance for each sensor module and adjusting a weight of the contribution of the detection results from the sensor module in the unified perception solution according to the sensor performance.

As embodied and broadly described herein, the invention further includes a process, comprising, providing a plurality of sensor modules for sensing a scene containing objects of interest, each sensor module operating according to a respective sensor modality, providing a sensor fusion module for fusing detection results from the plurality of sensor modules into a unified perception solution by a fusing process, the fusing process including determining sensor performance for each sensor module and adjusting a weight of the contribution of the detection results from the sensor module in the unified perception solution according to the sensor performance. As embodied and broadly described herein, the invention includes a system, comprising a plurality of sensor modules for sensing a scene containing objects of interest, each sensor module operating according to a respective sensor modality and according to a respective time domain, each sensor module including a sensor input for receiving sensor data from a sensor of the respective modality and a software-based perception entity processing the sensor data to detect objects of interest in the sensor data in the respective time domain. The system further includes a sensor fusion module including an input for receiving asynchronous detection results from the plurality of sensor modules and a processing entity for synchronizing the detection results and fusing the synchronized detection results into a unified perception solution.

As embodied and broadly described herein, the invention further includes a process, comprising providing a plurality of sensor modules for sensing a scene containing objects of interest, each sensor module operating according to a respective sensor modality and according to a respective time domain, each sensor module including a sensor input for receiving sensor data from a sensor of the respective modality software-based perception entity processing the sensor data to detect objects of interest in the sensor data in the respective time domain. The invention further includes providing a sensor fusion module including an input for receiving asynchronous detection results from the plurality of sensor modules and processing the detection results by a processing entity for synchronizing the detection results and fusing the synchronized detection results into a unified perception solution.

As embodied and broadly described herein, the invention further provides a system, comprising a plurality of sensor modules for sensing a scene containing objects of interest, each sensor module operating according to a respective sensor modality and according to a respective time domain, wherein each sensor module including a sensor input for receiving sensor data from a sensor of the respective modality and a modality specific, software-based perception entity processing the sensor data to detect objects of interest in the sensor data in the respective time domain. The system further includes a sensor fusion module having an input for receiving asynchronous detection results from the plurality of sensor modules and a processing entity for synchronizing the detection results and fusing the synchronized detection results into a unified perception solution.

As embodied and broadly described herein, the invention provides an automated method system, comprising providing a lidar apparatus, including a transmitter configured to emit light comprising light pulses toward a scene including one or more target objects and a receiver configured to detect reflected light from one or more of the target objects, the lidar apparatus configured to generate in response to the reflected light lidar data of the scene conveying distance values. The method further includes providing an image capturing device to generate image data of the scene, the image data conveying a plurality of pixels, providing a data processing entity having an input for receiving the lidar data and/or the image data and processing the lidar data and/or the image data to derive a scene fingerprint conveying one or more characteristics of the scene, storing in a machine-readable storage of the data processing entity a library of lidar apparatus operational modes, deriving from the library a lidar apparatus operational mode corresponding to the fingerprint, controlling the operation of the lidar apparatus according to the derived operational mode, generating with the data processing entity a 3D map of the scene and processing the 3D map of the scene with the data processing entity to identify a target object in the scene.

BRIEF DESCRIPTION OF THE DRAWINGS

FIG. 1A is a top-level block diagram of an environmental perception system according to an example of implementation of the invention;

FIG. 2 is a block diagram of a camera perception module of the system shown in FIG. 1;

FIG. 3 illustrates a 2D image processed by the camera perception module, illustrating detection results, in particular the identification in the image of objects of interest;

FIG. 4A is a block diagram of a lidar perception module of the system shown in FIG. 1A;

FIG. 4B is a flowchart of a process performed by the lidar perception module to perform motion correction on the lidar data;

FIG. 5 is an illustration of a lidar perception output, showing detection results, such as objects of interest detected in the scene;

FIG. 6 is a block diagram of a radar perception module of the system shown in FIG. 1;

FIG. 7 is an illustration of a radar perception output showing detection results, such as clusters to detect a single truck;

FIG. 8A is a block diagram of an ego-motion module of the system shown in FIG. 1A;

FIG. 9 is a representation of a vehicle track made up of two superimposed traces, the one in blue being the output of the ego-motion module of FIG. 8A, which is camera and lidar based, the pink trace being GNSS derived as ground truth;

FIG. 10 illustrates the ego-motion key points connections between two images;

FIG. 11 is a block diagram of a localization module of the system shown in FIG. 1A;

FIG. 12 is similar to the representation of FIG. 9, showing basic localization results;

FIG. 13 is a block diagram of a sensor fusion module of the system of FIG. 1;

FIG. 14 is a 3D reconstruction map of the environment obtained by the system according to the invention, shown along a depth map from a Velodine 64 lidar to illustrate differences;

FIG. 15 is a reconstruction map of the environment using an RGB-D-V model showing the velocity computed for objects of interest;

FIG. 16A is block diagram of the raw data fusion module of the system of FIG. 1;

FIG. 16C is conceptual representation of a lidar operational modes library;

FIG. 16D is a flow chart of a process to perform system configuration including a selection of a lidar type;

FIG. 16E is a flowchart of a process performed by the 3D reconstruction module of the block diagram shown in FIG. 16A, illustrating a process to select an operational mode of the lidar sensor adapted to the driving environment;

FIG. 16F is flowchart of a process performed by the 3D reconstruction functional block to perform an upsampling operation;

FIG. 17 illustrates a reconstruction example of a map on the basis of a 2D image and a 3D lidar point cloud having a significantly lower resolution than the 2D image;

FIG. 18 is a camera view of a 3D detection and enhancement process;

FIG. 19 is lidar view of a 3D detection and enhancement process;

FIG. 20 is a camera view of a scene with small obstacles on a roadway;

FIG. 21 shows the small obstacles detections of the scene in FIG. 20;

FIG. 22 is a block diagram showing the main software modules of the system of FIG. 1A and the operational time domain;

FIG. 23 is a flowchart of a calibration process;

FIG. 24 is a block diagram of a calibration module of the system of FIG. 1A;

FIG. 25 is an example of calibration between a lidar point cloud and an image;

FIGS. 26 and 27 are examples of calibration set-ups;

FIG. 28 shows a scene with free space detection;

FIG. 29 shows a scene with road and lanes detection;

FIG. 30 shows two examples of an occupancy grid;

FIG. 31 is a first example of a corner case where the vehicle is in a tunnel;

FIG. 32 is a fifth example of a corner case, which is an insect or other foreign matter on the glass and blocking part of the image;

FIG. 33 is a sixth example of corner case which is the camera facing the sun;

FIG. 34 is a seventh example of a corner case which is rainy conditions.

DESCRIPTION OF AN EXAMPLE OF IMPLEMENTATION OF THE INVENTION

Figure 1B:
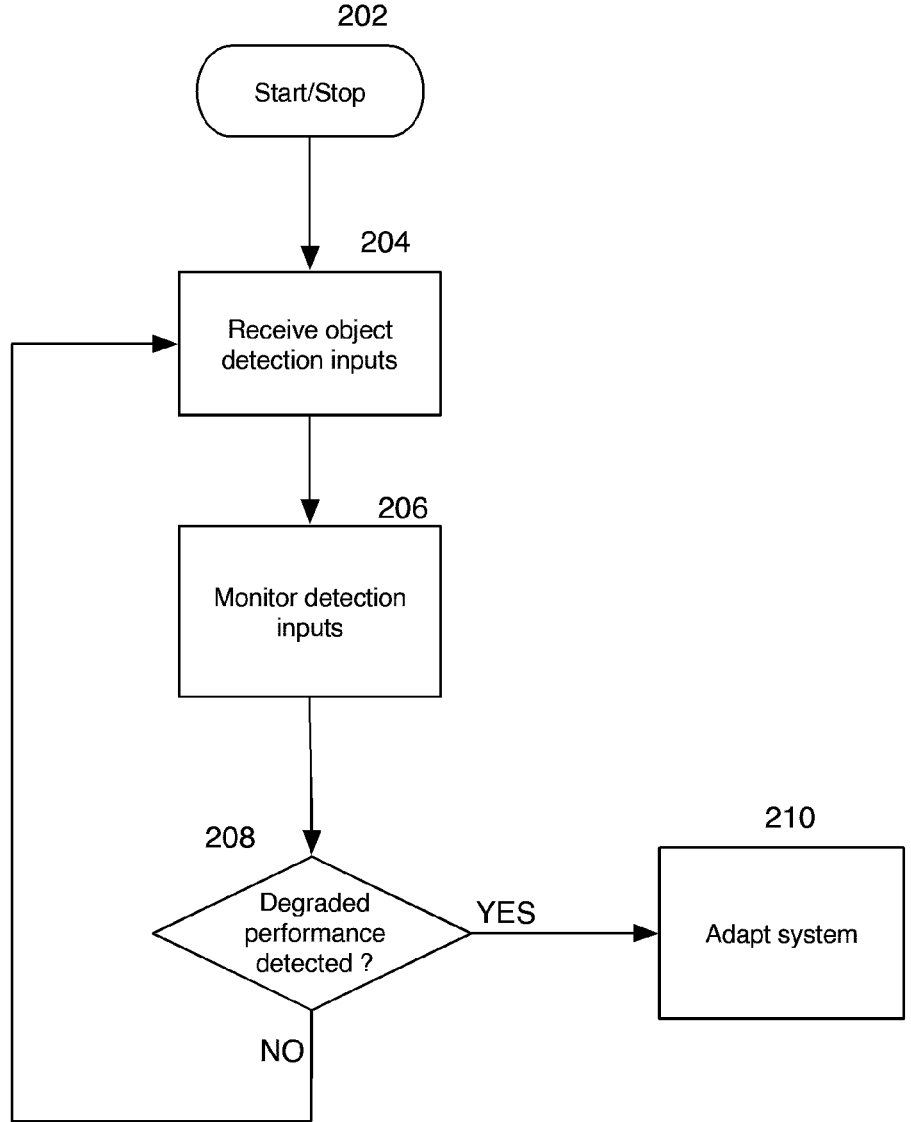
FIG. 1B is a flowchart of a process implemented by the health monitoring functional block of the system shown in FIG. 1A.

With specific reference to FIG. 1, the block diagram illustrates a system 10 for performing environmental perception. The system has different functional elements which are implemented in hardware or software to perform individual tasks. At the top level, the functional elements form two separate functional entities, namely a sensor perception entity 12 whose outputs feed into a perception engine entity 14 including a plurality of individual modules that will be described in detail later. The output of the perception engine entity 14 is information that can be passed to a path planning module (not shown) for generating a driving path for the autonomous vehicle.

The sensor perception entity 12 includes a plurality of modules associated with different sensors. In a specific example, the sensors are different modalities sensors, for instance a camera sensor, a lidar sensor and a radar sensor, among other possible sensors.

FIG. 2 is a block diagram of a camera perception module 16. It will be understood that there may be several instances of the camera perception module 16, where each instance is associated with a different camera sensor. That would be the case when each camera faces different directions to collectively provide a wide-angle camera coverage, namely a 180 degrees coverage or a 360 degrees coverage. The camera perception module 16 has a camera pre-processing block 18 with input 20 receiving the high-resolution image native to the camera sensor. The purpose of the camera preprocessing block is to undistort the image using calibration information. The calibration information would be specific to the installation, such as the vehicle on which the camera is placed as the mounting location on the vehicle could affect calibration. The calibration also depends on the optics such the field of view and the focal length. Those parameters need to be taken into account when the calibration is performed. The calibration will be discussed later. The calibrated image information is supplied to a camera detection block 22. The purpose of the detector block 22 is to identify objects of interest in the image and also geometric features of the scene represented by the image. Examples of objects of interest include vehicles and pedestrians among others. Examples of geometric features detection includes road detection, lanes detection, landmark detection and occupied areas, among others.

The camera detector block 22 can be implemented by a convolutional neural network, which is trained to detect objects of interest in the image. Geometric features in the image can be detected by known geometric algorithms which process the image to extract the features of interest.

The specific example of implementation depicted in FIG. 2, shows that the output of the camera detector 22 includes a first output identifying the objects of interest, a second output identifying landmarks and a third output identifying free space. FIG. 3 shows the camera image that has been processed by the camera detector block 22 with the detection results highlighted. The objects of interest, namely vehicles are identified by bounding boxes in blue. Free space, which is the roadway ahead of the camera is identified in green. The camera detector functional block can also output, as a result of the image processing a bird's eye view of the scene which is shown on the right of the main image in FIG. 3.

FIG. 4A is a block diagram of a lidar perception module 24. In this specific example of implementation, the architecture uses a single lidar perception module 24, in contrast to the camera perception that may have several instances of the module operating in parallel. The purpose is to develop a unified point cloud from multiple lidar sensors and then perform the detection in that common point cloud. But this is not a requirement. In other words, it is possible to have an implementation where the system has multiple instances of the lidar perception module where detection is performed on the individual point cloud generated by a single lidar sensor.

The lidar perception module 24 has a lidar preprocess functional block 26 that receives the inputs of all the lidar sensors at 28. In a typical implementation, the lidar sensors would be mounted to different positions on the vehicle to provide a wide-angle coverage, such as a 360 degrees coverage. Accordingly, in this implementation, the range of inputs 28 may be providing a lidar picture all around the vehicle. Specifically, the lidar preprocess functional block 26 would output a unified point cloud depicting the environment around the vehicle.

The lidar pre-process functional block 26 has two main functions. One is to correct the lidar data due to movement of the vehicle and the other is to merge the motion corrected lidar data into a unified point cloud. Since a lidar sensor has a scanning period which takes a defined amount of time (approx. 50-100 ms) there is a fluctuation of the point cloud dependent on the AV's speed. This fluctuation needs to be realigned (or unrolled) in order to compensate the error created. The unroll mechanism uses the Ego-Motion to calculate the prediction of each point in the point cloud to its correct position in relation to the vehicle.

This unroll mechanism uses ego-motion information supplied at an ego motion input 30. The ego-motion information is supplied by an ego-motion module of the system of FIG. 1A. That module will be described later. For the moment, suffice it to say that it provides ego-motion information which is based on the camera sensors and possibly input from an Inertial Measurement Unit (IMU) and possibly other sensors. The ego-motion information allows accurately locating the vehicle on each frame and comprises a motion vector and trajectory of the host vehicle. FIG. 4B is flowchart that describes the motion correction process performed by the lidar preprocess functional block 26. The process starts at 32. At step 34 the input 30 receives ego-motion information. At step 36, the preprocess functional block 26 receives the inputs from a range of lidar sensors. The example assumes three lidar sensors. There could be one lidar sensor (sensor 1) mounted at the front of the vehicle and scanning the scene ahead of the vehicle, one lidar sensor (sensor 2) mounted on the left side of the vehicle and scanning the left side of the scene and one lidar sensor (sensor 3) mounted on the right side of the vehicle and scanning the right side of the scene.

Step 38 performs ego-motion correction on each lidar sensor stream independently. The process includes re-aligning some or all of the points in each lidar data frame to compensate for movement of the host vehicle during a lidar sensor scan. The distortion induced by the movement is dependent on the speed of the vehicle and its trajectory but also on the lidar sensor itself. For example, a fast scanning lidar, one where the scanning period necessary to produce a full lidar data frame is relatively short, will induce a lesser distortion than one where the scanning period is longer. Also, the location on the vehicle at which the lidar is placed will influence the distortion. For example, in the case of a vehicle moving straight ahead without any lateral motion component, assuming the speed of the vehicle is negligible relative to the speed of travel of the lidar optical signal, the lidar data frame produced during a scan may not have much distortion into it. In contrast, for a lidar mounted on the side of the vehicle and looking at the side of the scene, such as lidar sensor 2 and 3 in the above example, the movement of the vehicle will 'stretch' the scene because there is a significant lateral motion with respect to the lidar sensing direction. In order to perform the correction, the algorithm in the lidar pre-process functional block 26 receives as input the ego-motion information and also reads from a calibration file the specifications of each lidar sensor, such as the location of the sensor on the vehicle, certain technical specifications such as the scanning speed, etc. The calibration file thus allows to significantly abstract the lidar signal processing from the physical sensor. By changing the lidar calibration file the architecture of FIG. 1A can be adapted to a range of different lidar sensors and to a range of vehicle platforms where the placement of the sensors varies. In order to adapt the architecture of FIG. 1A to a new vehicle platform, where the placement of the sensors may be already determined, it suffices to change the calibration file and there may not be any need to alter or adapt the detection algorithms. This modular approach provides flexibility as it decouples the processing algorithms from the hardware.

Referring back to FIG. 4B, the output of the processing step 38 is motion compensated lidar data frames. At step 40 the motion compensated lidar data frames are "stitched" into a unified point cloud by the pre-processing functional block

26. Accordingly, the output 42 of the pre-processing functional block 26 produces a point cloud in a format that is suitable for the remainder of the processing and that is independent from the native data output of the sensors.

Referring back to FIG. 4A, it will be seen that the output 40 has two streams that convey the same lidar data, one being directed to a lidar detector functional block 42. The latter uses a convolutional neural network to process the unified point cloud to detect objects of interest in the scene along with geometric information, such as free space and occupied areas.

FIG. 5 illustrates conceptually the output of the lidar detector functional block 42, including bounding boxes for objects of interest identified in the lidar data flow. In this case the objects of interest are vehicles. On the right-hand side of the main image is shown a bird's eye view of the point cloud in which the objects of interest are identified with bounding boxes. Each bounding box shows the location of the object of interest into the point cloud and also shows velocity and trajectory. The arrows associated with each bounding box depict the velocity and the trajectory.

A block diagram of the radar perception module 44 is shown in FIG. 6. The radar perception module 44 has an input 46 to receive radar signals. The input 46 can support both imaging radar and 2D radar. The imaging radar has the ability to create a 4D data input similar to a lidar point cloud, including a velocity at each point.

The input from the one or more imaging radars is fed to an imaging pre-processing functional block 48. The pre-processing functional block 48 aligns the output of the different imaging radar sensors to produce a unified imaging radar raw data. Similarly, a pre-processing functional block 50 receives the input from a plurality of 2D radar sensors and merges them into a unified 2D raw data. Note that the 2D pre-processing functional block 50 has the ability to perform object detection from the 2D radar data and can therefore output primary object detection information at output 51 along the 2D raw radar data on output 53. The output of the imaging pre-processing functional block 48 is supplied to a 3D detector functional block 52, which is implemented as a convolutional neural network trained to detect in the imaging radar data objects of interest. Also, by using geometric detection algorithms, geometric features of the scene can be identified, such as plane estimations (road, sidewalk, etc.) and occupied areas.

Similarly, a 2D detector functional block 54 receives as input the raw unified data from the 2D pre-processing functional block 50 and primary object detection information. The 2D detector functional block 54 also uses a Deep Neural Network concept, implemented by a convolutional neural network to perform object detection and geometrical features detection in the scene. The 3D detector functional block 52 and the 2D detector functional block 54 output each the detected 3D objects. Both outputs are merged at 56, it being understood that an optional mechanism can be provided to address discrepancies and resolve ambiguities at the two detection levels.

FIG. 7 is an illustration of a radar image post detection by either one of the detection functional blocks 52 and 54, showing detections in the radar picture.

Figure 8B:
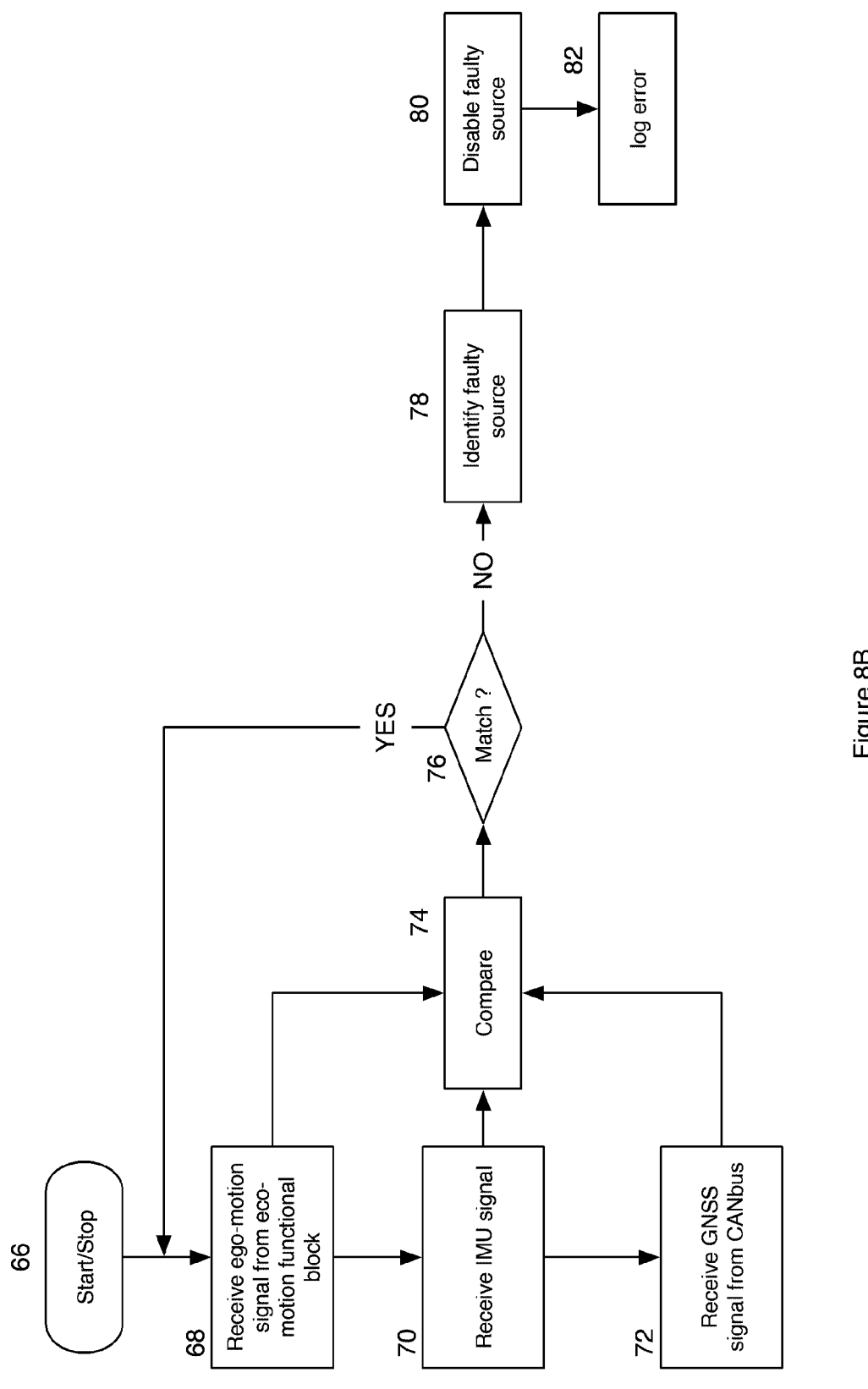
FIG. 8B is a flowchart illustrating a process performed by the ego-motion module of FIG. 8A.

FIG. 8A is a block diagram of an ego-motion module 58 of the system shown in FIG. 1. The purpose of the ego-motion module 58 is to localize the vehicle on each frame of the 3D point cloud developed by fusing the camera, lidar and radar data. The ego-motion algorithms use as input consecutive data frames from the sensors, camera and lidar, among others to estimate motion between consecutive frames and thus derive a motion vector and a trajectory for the host car. It will be noted that ego-motion can be computed without reliance on any additional sensors, such as Global Navigation Satellite System (GNSS) or IMU sensors. This enables ego-motion estimation to be done is cases where no GNSS signal is available, such as when the vehicle is in a tunnel for example. Still, the additional sensors can be used for reliability purposes and determine if the primary ego-motion calculation is correct.

The ego-motion module 58 has an ego-motion estimation functional block 59, which receives at an input 60 a previously calculated 3D map from the sensor fusion operation, which is discussed in detail below. The ego-motion functional block 59 also receives the camera image data frames at input 62 and the unified point cloud lidar output by the lidar pre-processing functional block 26. The algorithm of the ego-motion module compares frames that represent the scene at different moments in time to identify relative motion between certain scene features. The difference in movement, represents a distance travelled and a direction of travel. Speed can be calculated on the basis of the time difference between the data frames. On that basis, the ego-motion module can output ego-motion information which is used in other modules of the system of FIG. 1.

FIG. 10 is a representation of two consecutive image data frames that are overlaid to show relative movement. The ego-motion algorithm will process the first camera data frame to identify one or more key points that will be used as a basis for the comparison. The number and the location of the points can vary. It is preferred to array the points throughout the image to obtain displacement information for different motion components, such as forward of the vehicle, left of the vehicle, right of the vehicle, etc. Once the points are determined, the algorithm will process the subsequent frame to locate the points in that frame and will compute the relative displacement between respective points in the two frames. On the basis of the displacement between pairs of points, distance, velocity and trajectory for the host vehicle is computed. It is preferred to compare data frames of the 3D map, as in addition to the image data, the 3D map also conveys distance information for each point in relation to the host vehicle, thus allowing to more precisely compute displacement between points in successive data frames.

The ego-motion information is output by the ego-motion functional block 59 to an optional ego-motion merger functional block 64 that merges ego-motion information received from different sources. The ego-motion merger functional block 64 has an input from an IMU unit and from the Controller Area Network bus (CANbus) of the vehicle conveying GNSS information. The IMU unit may be part of the system shown in FIG. 1A and includes accelerometers, gyroscopes or both to provide inertial measurements. The ego-motion merger functional block 64 processes the three ego-motion information signals as is depicted by the flow-chart shown at FIG. 8B.

The process starts at 66. At step 68, the ego-motion merger functional block 64, receives the ego-motion signal from the ego-motion functional block 59. At step 70, the ego-motion merger functional block 64 receives the IMU signal. At step 72, the ego-motion merger functional block 64 receives the GNSS signal. At step 74 the three signals are compared. If they match, as per the decision step the process loops back for each new iteration of the ego-motion. A match is considered to exist when the ego-motion developed from each source does not deviate from the other sources by a predetermined threshold. An example of a match is shown at FIG. 9, illustrating the ego-motion computed when a vehicle travels over a certain path. The track in blue is the computed ego-motion output from the ego-motion functional block 59, while the pink track is a GNSS derived ego-motion. Since both tracks are quasi identical, the comparison step 76 would consider them as being a match.

In the case there is no match and there is a discrepancy by a certain amount that exceeds the threshold, the process continues with step 78 where the ego motion merger functional block 64 will identify the source of the discrepancy, which could involve determining among the three sources the one that is faulty. For instance, if two sources coincide while a third one does not it is likely the third source is the faulty one. In that case the process will disable the faulty source at step 80 by ignoring that input. An error is logged at 82 such that the issue can be diagnosed during maintenance.

FIG. 11 is a block diagram of the localization module 84 provided to compute localization information in the context of the environment of the vehicle. For example, the localization information can specify where the vehicle is located in relation to other vehicles and/or in relation to road features and landmarks. This added context facilitates path planning by the autonomous driving logic. In the specific example of FIG. 11, the localization module receives two categories of inputs, namely an input indicating an absolute position of the vehicle and an input indicating the scene context.

The localization module 84 uses these inputs to locate the vehicle in the context of the scene, preferably computing a probability or confidence of the location on the basis of the prior position of the vehicle. More specifically, the localization module 84 has an input 86 that receives the ego-motion information output from the ego-motion module 58. The ego-motion information at the ego-motion input 86 is suppled to an input of a Bayesian filter functional block 88. In addition, the localization module 84 has an occupancy grid input, that provides occupancy grid information which is generated by a sensor fusion module to be described later. The occupancy grid information is perception-based and describes the scene around the vehicle, in terms of objects of interest identified in the scene, tracking information in relation to the vehicles of interests that have been identified and free space, among others. The occupancy grid information is suppled to a road lateral estimation functional module 90. The road lateral estimation functional module 90 processes the occupancy grid information to extract from it the road boundaries.

The output of the road lateral estimation functional module 90 is supplied to the Bayesian filter functional block 88. A landmarks localization functional module 92 receives the occupancy grid information, landmarks information supplied at input 94 and a Geographic Information System (GIS)/High Density (HD) map at input 96. The landmarks localization functional block 92 will extract landmarks, which are objects or features that are typically static along the road. Examples include road signs, traffic lights, road intersections, ramps, rest areas, railway crossings, bridges, tunnels, road imperfections such as sections of broken pavement, speed bumps, overpasses, pedestrian crossings and designated parking spaces, among others. The landmarks localization functional block 92 will merge the landmarks from the different sources to provide a unified landmark set that is supplied to the Bayesian filter functional block 88.

The Bayesian filter functional block 88 receives the ego-motion information, GNSS information, the road lateral estimation, the unified landmarks localization to determine a position of the vehicle in the scene, which is constantly updated as the above inputs change, by applying a Bayesian probability analysis. The Bayesian filter functional block 88 uses a motion model 98 that describes spatial relationships between objects in the scene and the vehicle, allowing to create a representation of the vehicle in its driving environment. The Bayesian filter functional block 88 outputs localization information which conveys the representation of the vehicle in its driving environment including the objects of interest in the vicinity of the vehicles including road boundaries and landmarks.

FIG. 13 is a block diagram of a sensor fusion module 100 that receives inputs form the different sensors described earlier and integrates the raw data from sensors to generate in a specific example of implementation a 3D RGB-D-V model. Preferably, it also incorporates 3D reconstruction to enrich and add robustness to the model. Sensor data is fused in an intelligent manner, adding temporal information (e.g. information from multiple frames) as well as more accurate representations of a single measurements (e.g. multiple measurements of a single object to enable reducing the relative error for the measurement).

The 3D RGB-D-V also provides an abstraction layer between the sensors and the perception algorithms. This enbales changing the sensors; brand, resolution, position and so forth without the need for modifying the algorithms. This added benefit reduces the testing, verification and validation required of the system.

More specifically, the sensor fusion module 100 includes a raw data fusion functional block 102 that receives at input 104 the raw lidar data output by the lidar pre-process functional block 26. The raw data fusion functional block 102 further receives the camera image data output from the camera pre-process functional block 18 and receives at input 108 the raw radar data output from the imaging pre-process functional block 48 and the 2D radar pre-process functional block 50.

Examples of camera and lidar fusion including 3D reconstruction are provided in the following patent publications, the contents of which are hereby incorporated by reference (1) U.S. Pat. No. 10,444,357; (2) US2016/0291154; (3) U.S. Pat. No. 10,024,965; (4) U.S. Pat. No. 10,445,928.

FIG. 14 illustrates the 3D map produced as a result of fusing the camera data with the lidar data and also performing 3D reconstruction. The image on the top is the 3D map obtained from a high-end lidar such as the a Velodyne HDL-64E lidar. The image on the bottom is obtained by using the raw data fusion functional block 102. It will be noted that even for a high end lidar, there are relatively few depth measurements (colored points) and the resolution is low. In contrast, the 3D reconstruction map method implemented by the raw data sensor fusion 102 produces a much higher resolution map in spite the fact the lidar used has a lower resolution than the one for the lower map. In this example, the lower map has 10 times more points than the upper map and it is of much higher resolution.

FIG. 15 is yet another example of a high-density 3D reconstruction map obtained with the raw data sensor fusion functional block 102. The velocity information for objects in the scene is depicted at the bottom, below the scene image.

FIG. 16A is a more detailed block diagram of the raw data fusion functional block 102. The raw data fusion functional block 102 has a 3D reconstruction functional block 104, a 3D enhancement functional block 106, an RGB-D-V object detector functional block 108 and a geometric occupancy grid functional block 112.

The 3D reconstruction functional block receives at input 114 the camera image output from the camera pre-process functional block 18, at input 116 ego motion information output by the ego-motion merger functional block 64, at input 118 lidar raw data such as the unified point cloud output by the lidar raw pre-process and merge functional block 26 and input 120 receiving the unified radar data output by the imaging pre-processing functional block 48 and by the 2D radar raw pre-processing and merge functional block 50. The 3D reconstruction functional block 104 has one output, namely output 122 that outputs the high-density 3D map of the scene.

In a specific example of implementation, the 3D map of the scene is structured as a series of pixels, each pixel characterized by Red, Green and Blue (RGB) color information. At least for a subset of the pixels depicting a portion of the scene, distance (D) information with relation to a particular reference, such as the host vehicle is provided for individual ones of the pixels in the set. While desirable to provide distance information for each pixel in the camera image, that may not be practical and even necessary as there are scene areas where it is not necessary to know that distances to objects in order to provide safe and effective autonomous driving. Accordingly, the 3D reconstruction may not be performed for those peripheral areas.

The RGB-D-V data is also output to the ego-motion module 58 to enable computation of the ego-motion as described earlier.

Figure 16B:
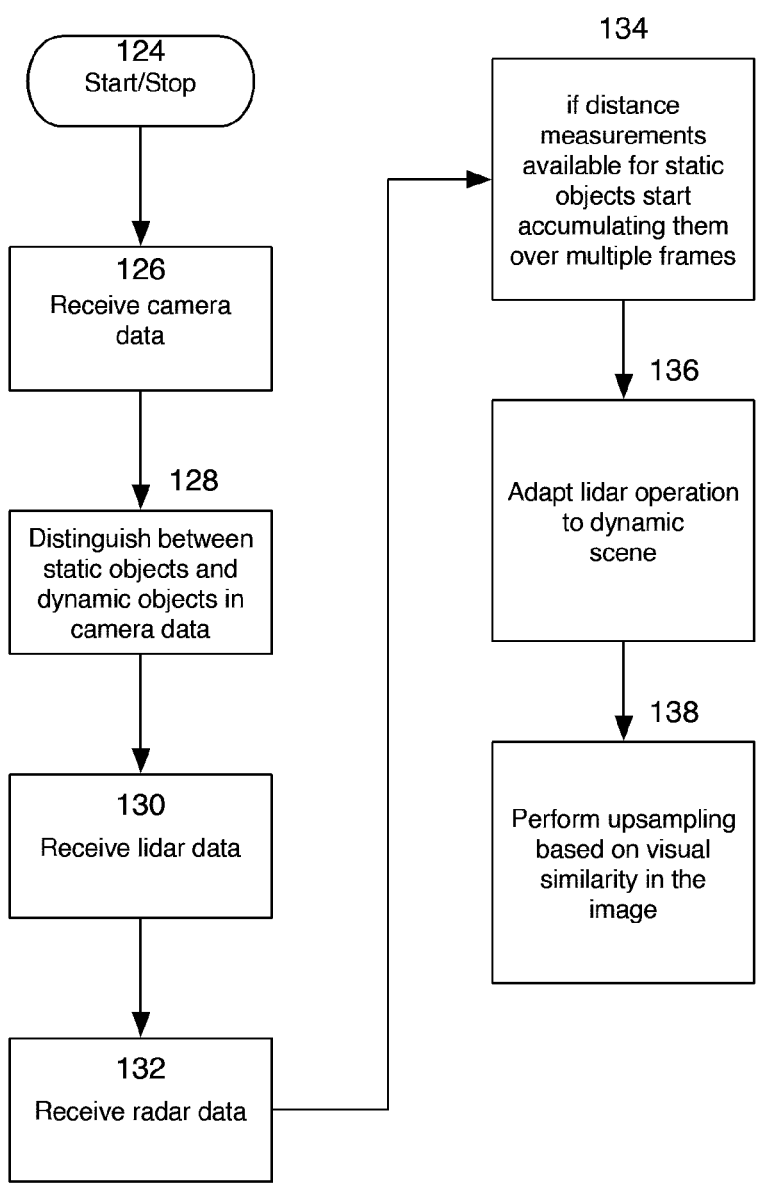
FIG. 16B is block diagram of a process implemented by a 3D reconstruction functional block shown in the block diagram of FIG. 16A.

FIG. 16B is a flowchart of a process performed by the 3D reconstruction functional block 104. The process starts at 124. At step 126 a frame of the camera data is received, which preferably is a high definition image, which enables the perception solution to be very discriminative in the image domain. The camera frame is processed to distinguish between static and dynamic objects in the image. This operation could be done by comparing the currently received frame to a previous frame or multiple previous frames in order to determine the relative position of objects in the scene, how they have moved relative to each other and thus determine which objects are moving and which objects are stationary. In a specific example of implementation, the algorithm may divide the image is sectors and determine if anyone of the sectors contains a moving object. If none is found, the sector is determined to be static.

The sectors can be quadrants. Alternatively, the sectors can be shaped to more accurately reflect the static and dynamic areas of a scene such as seen when looking ahead in a moving vehicle. In other words, the scene can be divided into three bands of identical or different width, each band running from top to bottom of the scene, there being a central band overlaying the road ahead and two parallel bands corresponding to the two sides of the road. In most driving scenarios, the dynamic objects would be curtailed to the central band while the two peripheral bands would contain static objects. Since the position of the static objects is highly predictable relative to the host vehicle over time, it is not necessary to update the distance measurements to these objects as often as those in relation to dynamic objects that are themselves moving and much less predictable.

At step 130 and at step 132 lidar data and radar data is received. Distance measurements from objects residing in static sectors are accumulated over multiple frames (while possibly corrected to account for the movement of the host vehicle). At step 136, the algorithm would issue control signals to the lidar perception module 24 and to the radar perception module in order to focus the distance gathering operation to the sector containing the dynamic objects. For example, such control for the lidar operation could modulate the operation of the lidar to update more often the distance measurements in the dynamic objects sector at the expense of slower updates of the distance measurements in the sectors with the static objects.

The modulation of the lidar can include dynamically adapting the scanning operation. For instance, the lidar has a scanning cycle where the scene or a portion thereof is swept with optical signals and the optical returns are collected. The scanning cycle is defined by a scan angle and a scan direction. The scan direction can be horizontal, in other words the scan sweeps the scene from left to right. The scan direction can also be vertical, for example from top to bottom. Any suitable scan pattern can be used, for instance a scan that moves the optical signal in two different directions to "paint" the scene completely or partially, such as a raster scan.

By controlling the scan, it is therefore possible to modulate or adapt the distance measurement operation to the current environment and focus the distance measurements where they are needed the most, namely in the areas where objects in the vicinity of the host vehicle can move in an unpredictable fashion with relation to the host vehicle.

One parameter of the scan cycle that can be used to modulate the distance measurement operation is the scan angle, which is the sweep angle of the optical signal. By reducing the scan angle such that it is directed at the areas where dynamic objects reside, the scan frequency can be increased as there is less area to scan, hence the distance measurements can be updated more rapidly. In addition to the scan angle, the scan axis, which is the direction or bearing of the scan can be controlled. For example, the bearing of the scan can be adjusted toward a direction of interest such as the one containing the dynamic objects. In the example provided above, the scan bearing can be adjusted to match the host vehicle heading such as the road ahead where most dynamic objects would reside. Periodically, the scan heading, or scan angle can change to sweep the sides of the road to provide a distance update in relation to the sectors that hold static objects.

Other parameters of the lidar can be varied to provide an adaptive operation. The intensity of the optical signal can vary in dependence of the scene. Also, the pulse rate of the optical signal can be changed, which for a lidar that operates on the concept of pulse returns accumulations, can be used to control the signal to noise ratio.

A practical way to change the lidar operational mode in dependence of the scene is to use a library of lidar operational settings. In this form of implementation, the algorithm of the 3D reconstruction functional block 102 chooses the appropriate lidar operational setting from the library and sends a signal to the lidar perception module 24 to implement it. An advantage of this approach is that the library can be designed to support a range of different lidar types, of different manufacturers and models. Accordingly, the library provides an abstraction layer allowing the raw data fusion module 102 to seamlessly function with many different lidars.

FIG. 16C illustrates a data structure for a lidar operational mode library. The library is organized by lidar type, where each type is identified by a unique identifier that distinguishes it from the other types in the library such that there is no confusion. Each lidar type is characterized by technical specifications. In a specific example, a lidar type can be a commercial lidar product made by a manufacturer under a product model. The operational modes under each lidar type are operational modes that such lidar type supports. When the system shown in FIG. 1A is being set-up, the lidar type is specified such that the correct operational modes will be referenced during operation.

This configuration process is shown in the flowchart of FIG. 16D. The configuration process starts at step 140. At step 142, the operator or technician performing the configuration sets up the system into configuration mode where various system settings can be made. The configuration mode can invoke a GUI screen where different configuration settings are available. Through that GUI screen, the technician accesses the lidar settings at step 144 where the lidar type can be specified. For example, the list of supported lidar types can appear in the form of a menu of options and the technician selects the one that is physically installed on the host vehicle. Once the selection of the of the lidar type is made, that selection is recorded in a configuration file stored in the system memory, as shown at step 146.

During operation, the lidar type stored in the configuration file is used to select among the operational modes stored in memory, the one to be implemented at any given time. In other words, only the operational modes that are compatible with the installed lidar type are available for selection. All the other modes associated with different lidar types cannot be selected by the 3D reconstruction functional block 104. Note that in instances where several lidar sensors are placed on the host vehicle, the operational mode selection for each one of them can be made in an independent fashion. In other words, there may be a configuration file identifying a lidar location on the host vehicle, such as front, side or rear, where for each location a lidar type can be selected as described above. In that example, the configuration file will specify the lidar type for each location and the system will then be able to select independently the operational mode for each lidar based on the operational modes library stored in memory.

The operational modes library can be updated periodically to add new operational modes to improve system performance, without the need to change system hardware such as the actual sensors. The selection of one operational mode, among the range of possible operational modes is performed by the 3D reconstruction functional block 104 dynamically based on the scene. In other words, the 3D reconstruction functional block 104 will select an operational mode that best matches the scene characteristics. One example of selection logic is to identify in the environment features that characterize the environment. The different operational modes can be selected on the basis of the environment features observed. For instance, each operational mode can be associated with a particular set of environment features. Once those features are identified, the operational mode that matches those features is selected.

In a specific example, the 3D reconstruction functional block 104 computes an environment fingerprint that reflects certain characteristics of the environment, such as pattern of dynamic objects in the scene (center vs sides); quality of the perception (are there fuzzy or unclear sectors in the scene), type of driving environment (urban vs highway or off-road). The 3D reconstruction functional block may therefore be configured to classify the environment as conveyed by the perception inputs into one of a predetermined number of categories, each category being associated with a particular environment fingerprint.

The selection can be made by using a convolutional neural network that is trained to recognize different driving environments and classify them in pre-determined categories. In turn, the operational modes of the lidar sensor are associated to respective categories and once the 3D reconstruction functional block diagram 104 has determined a category for the current environment, the lidar operational mode is automatically selected. The category determination is performed continuously and if the category changes because the environment changes, it will trigger an automatic adaptation of the lidar operational mode.

Note that the categorization of the environment can be done on the basis of image information on its own, lidar and/or radar information on its own or the fused data camera and lidar and/or radar.

The process is illustrated by the flowchart of FIG. 16E. The process starts at 148. At step 150, perception data representing the environment around the host vehicle is processed to identify a fingerprint, which as indicated earlier includes a set of characteristics that define the environment. At step 152 the operational mode of the lidar is selected on the basis of the fingerprint. In a specific example, there may be one to one correspondence between the fingerprints and the operational modes, such that a single operational mode is associated with a particular one of the fingerprints.

Once the operational mode of the lidar is selected by the 3D reconstruction functional block 104, a signal is issued by the 3D reconstruction functional block 104 to the lidar perception module 24. The lidar perception module 24 is responsible for the implementation of the operational mode, in particular the lidar perception mode 24 will generate the control signals to operate the lidar sensor according to the selected operational mode. The control signals include parameters of the scanning, parameters of the optical interrogation signal, etc. In a specific example of implementation, not shown in the drawings, the lidar perception module includes a control entity that receives the operational mode selection from the 3D reconstruction functional block 104 and converts this information into control signals for the lidar sensor in order to implement the operational mode.

Referring back to the flowchart of FIG. 16B, the process performed by the 3D reconstruction module includes carrying out a 3D reconstruction on the data by upsampling the distance measurements. This process is described in the following patent publications, the contents of which are hereby incorporated by reference (1) U.S. Pat. No. 10,444, 357; (2) US2016/0291154; (3) U.S. Pat. No. 10,024,965; (4) U.S. Pat. No. 10,445,928. For the sake of simplicity, it will be summarized by the flowchart of FIG. 16F. The concept of 3D reconstruction is to use visual similarity to allocate distance measurements to pixels in the image for which no distance measurements exists in the lidar point cloud. This method can be applied to a low-density scanning lidar shown at FIG. 17 by the representation at the bottom right which is the point cloud from the lidar. It will be noted that the resolution is relatively low. When fused with the high-density camera image shown at the top of the figure, including performing the upsampling operation, a rich 3D map is produced, shown at the bottom left. The resolution of the 3D map is significantly higher than the one of the lidar point cloud.

With reference to FIG. 16F, the 3D reconstruction or upsampling process starts at 154. At step 156 the camera image is segmented. The segmentation is performed on the basis of visual similarity. The image is divided into zones where the color is relatively uniform. Color uniformity is a programmable parameter, in the sense that color difference and/or intensity thresholds are used to divide the image in zones. Also, the granularity of the zones can also be varied. Smaller zones will provide a more precise upsampling, where the computed distance measurements will more accurately reflect the true distances.

At step 158 the process will associate the distance measurements in the lidar point cloud to respective zones produced by the segmentation process. Accordingly, each zone will be attributed a number of distance measurements that are within the boundaries of the zone. On the basis of these distance measurements the process will try to approximate the geometric surface making up the zone. Assume there are three distance measurements. These measurements define a plane, hence zones associated with three distance measurements can be assumed to be planar. The orientation of the plane is dependent on the actual distance measurements. For instance, if all the measurements are the same, the plane defining the zone would be a vertical plane. If the distance measurements are not the same, then the plane would be an inclined plane.

Accordingly, in this example, three distance measurements characterize the zone as a plane, and it is therefore possible to compute a distance for each pixel of that zone based on a planar equation defined by the real measurements from the point cloud. By interpolation and using the planar equation the process will compute a distance value for each pixel of the zone for which no distance measurement is available in the point cloud. This is shown by the step 160 in the flowchart of FIG. 16F.

For zones where more than three distance measurements are available, more complex surface fitting is possible. For instance, curved surfaces can be fitted and then the interpolation can be performed based on that curved surface.

The processing at FIG. 16F therefore produces a 3D map of RGB-D-V values that quite accurately depict the scene and enables, as it will be described below more accurate and robust object detection.

Referring back to FIG. 16A, the raw data fusion module 102 also includes a 3D enhancement functional block 106 having three inputs, namely input 162 receiving the unified radar data from the radar perception module 44, the detected objects information from the camera image at input 164, from the camera perception module 16, and input 166 receiving the lidar data, in particular the unified point cloud from the lidar perception module 24.

The 3D enhancement functional block 106 will merge the object detections from the camera image with 3D information, namely distance information to provide more accurate detection in cases where the camera image is unclear or for any other reason does not allow a sufficient level of confidence in the detection. Accordingly, for detected objects in the camera image where the confidence is lower than what would normally be required, the distance information from the radar data and/or lidar point cloud allows confirming that the detection is positive and thus increase the confidence level or determine that the detection is a false detection. The 3D enhancement functional block may use a convolutional neural network to perform the processing.

FIG. 18 is a camera view of the 3D enhancement output of the 3D enhancement functional block 106. FIG. 19 is a bird eye view if the output.

The raw data fusion functional block 102 also includes an RGB-D-V object detector functional block 110. The RGB-D-V object detector functional block 110 receives at its input the 3D map expressed in a 5-domain space RGB-D-V and performs object detection via a classification process with a convolutional neural network. The RGB-D-V outputs at 168 a description of the detected objects including a level of confidence. The block diagram at FIG. 16A shows the output flows from the 3D enhancement functional block diagram 106 and from the RGB-D-V functional module 110 merge at 170. It will be understood that the merge function can involve comparison between detected objects and resolution logic in case there is some discrepancy.

The raw data fusion functional block 102 also includes a geometric occupancy grid functional block 112 which receives at input 172 the RGB-D-V data of the 3D map of the environment and the free space and lanes detection at input 174 from the camera pre-processing module 16. The RGB-D-V model allows to model the geometric occupancy grid. Using the camera's detection of free space and lanes and the additional information received from the lidar/radar which enables the RGB-D-V model—the "Geometric Occupancy grid" module creates a bird eye view grid of the world surrounding the host vehicle which is more accurate than using the camera alone. Also, the RGB-D-V model allows very accurate key-point matching in 3D space thus enabling very accurate Ego-motion estimation. Specific examples of information that the occupancy grid outputs, include lane marks which distinguish the self-lane from other lanes in the direction of the host vehicle or against traffic, lane crossings, traffic slowdowns, etc.

FIG. 28 is an example output depicting the scene with free space detection identification.

FIG. 29 is an example output of the scene with lane detections.

The raw data fusion functional block 102 therefore outputs objects detection information at output 176 and a geometric occupancy grid at output 178.

The raw data sensor fusion together with 3D reconstruction, as described earlier provides more information that enables the detection algorithms to detect small objects farther than possible otherwise, as well as smaller obstacles that would otherwise escape detection. It is this capability that provides the ability to safely drive faster and in more demanding conditions. This solution also reduces the number of false alarms, such as those that can occur as a result of discoloration on the road, reflections or lidar errors.

The example shown in FIGS. 20 and 21 show the successful detection of small obstacles at relatively great distances.

Referring back to FIG. 13, the sensor fusion module 100 includes an occupancy grid functional block 180 which receives the geometric occupancy grid information from the raw data fusion functional block 102 and ego-motion information from the ego-motion merger functional block 64. The occupancy grid functional block 180 more precisely locates the host vehicle in the occupancy grid and outputs such occupancy grid information which is used as an input to the localization module 84. An example of the output produced by the occupancy grid functional block 180 is shown at FIG. 30.

The sensor fusion module 100 also includes a detection merger which receives the primary objects detection information from the camera perception module 16, the lidar perception module 24 and the radar perception module 44. The detection merger also receives the detection output form the raw data fusion functional block 102. The detection merger unifies these detection inputs, which each reflect the environment of the host vehicle in one unified detection output and adds semantic information to them which makes the scene interpretation easier by the host vehicle path planning controller.

The output of the detection merger functional block 182 is received by a tracker 184. The tracker 184 implements an algorithm to follow the motion path of the detected objects in 3D space by tracking the angular velocity through successive image frames, and the radial velocity through depthmage frames. When radar doppler data is available, that data can be used to supplement the tracking process. The tracker 184 can use the computed velocity information in relation to objects to distinguish between dynamic and static objects. For dynamic objects, the tracker 184 generates a 3d trajectory motion, which can be useful to the path planning software of the autonomous vehicle for path planning and crash prevention.

Referring back to FIG. 1, sensor fusion module 100 has an optional health monitoring functional block 200. The health monitoring block 200 receives the inputs that flow into the detection merger functional block 182 and monitors them to identify sensor failures, or degradations. In this implementation, the health monitor functional block 200 does not have access to sensor diagnostic information and rather relies on the output of the sensors to determine their health status. The advantage of this approach is that the health monitor can work with a range of different sensors and there is no need to adapt the system such that it can recognize diagnostic messages of different sensor brands and types.

The health monitoring functional block 200 performs the process according to the flowchart of FIG. 1B. The process starts at step 202. At step 204 the health monitoring functional block 200 receives the object detection inputs and at step 206 processes them to identify potential problems with anyone of the sensor flows. The processing includes any one of the following:

1. Detect the absence of anyone of the detection inputs, for example the absence of a signal or signal state suggesting no communication with the source of the signal. This would be typical of a hardware problem.
2. Examine the signals for correlation between the detection results. The notion is to see if the signals generally agree with each other within the limits of the sensor modalities. For example, some sensors may be able to detect objects that other cannot, and it is therefore normal that some object detections present in one sensor modality would be absent from another sensor modality. Specifically, the camera perception module 16 can distinguish between object classes, namely automobiles and pedestrians, among other classes. As such the object detection from the camera image will convey more characteristics about the detected objects than, say the radar object detection.

The process to evaluate the detection results for correlation can be done by comparing the detected objects in each sensor modality and if they agree, in terms of presence of objects and location of the objects, within a certain tolerance, the health monitoring functional block 200 determines that the signals are valid and takes no action as the system is performing normally. This is shown by the decision step at 208.

In a specific example, the processing compares the object detections across all the inputs and determines if objects are missing from any one of the detection streams. If objects are missing, the health monitoring functional block 200 determines if any of the missing objects belong to object classes that the particular sensor modality is capable of detecting. In the affirmative the processing identifies the sensor modality and continues tracking the detection performance over multiple frames. If a particular sensor modality accumulates over time more detection errors than other sensor modalities, this may be due to degraded detection performance. The degree of degradation may be indicated by the scale of the error detection.

Note that it is not unusual for a sensor modality to momentarily manifest a malfunction, namely miss some detections. This may be due to particular operational conditions of the host vehicle where the sensor naturally has a degraded performance. For example, dirt may accumulate on a camera viewing window with the result that the image captured by the camera sensor is partially obscured. An example is shown in FIG. 32, where an insect is sticking on the windshield with the result that a portion of the camera image is unclear.

FIG. 33 is another example of a temporarily degraded sensor performance, when the host vehicle drives in the sunset and the camera sensor is partially blinded. FIG. 34 is yet another example, where rain on the windshield makes the camera image fuzzy. FIG. 31 is yet another example, where the vehicle drives in a tunnel.

The health monitoring functional block 200 is configured to distinguish from short term degradation from a longer term one, indicative of a lasting effect. The distinguishing can be done by looking at the detection error rate over time. For temporary degradation, the detection error rate might spike but that error rate may disappear quickly when the vehicle returns to an operational condition where the sensor modality performs normally. For example, in the case of FIG. 40, the detection error rate for the camera modality should increase when the vehicle is in the tunnel because the camera sensor is blinded. However, the error rate should return to normal when the vehicle exits the tunnel.

The logic of the health monitoring functional block 200 is provided with configurable parameters to adjust the system sensitivity to detected errors. There may be an error rate detection threshold and a duration detection threshold. For example, for the system to start reacting to detection errors, the error rate must exceed a minimal threshold and the detection rate must stay above the threshold for a minimal amount of time. Note that the time threshold may be related to the detection error rate. For very high detection error rates the time frame for the system to react may be lessened.

As shown by step 210 in FIG. 1A, the system will perform an adaptation when a degraded sensor performance is detected. The adaptation could include disregarding a sensor modality from the perception processing to avoid corrupting the perception results. This would be the case when a hardware fault is detected. The health monitoring functional block 200 would generate a control signal over a control signal pathway (not shown in the drawings) to indicate to all the entities that process the output of that sensor modality to disregard the input. For example, in the case of a radar perception module failure, detected by the health monitoring module 200, the module will send control signals to the sensor fusion module 100, in particular to the raw data fusion functional block 102 and to the detection merger functional block 182 to disregard the detection results from the radar perception module. The perception processing therefore continues without the radar input with a possible overall performance degradation due to the absence of a sensor modality.

The same approach would be followed if a hard fault of the lidar perception module is noted. The raw data fusion functional block 102 and the detection merger functional block 182 will be instructed to disregard the lidar perception input, the result being that the downstream processing, in particular the raw data fusion calculations will be made on the basis of the camera and the radar sensors, with some expected level of overall performance degradation.

A hard camera sensor failure, where no image information is available, is a challenging situation because the camera sensor conveys a significant information about the environment. One option then is to default the vehicle to a safe state, namely execute a complete stop. To account for total camera vision failure, it is possible to provide the Ego-motion module 58 with a buffer in which are stored a number of previous frames, collected when the camera sensor was operational, such that ego-motion information is available while the vehicle executes the complete stop, that would typically involve driving the vehicle toward the side of the road and then stopping in. The number of frames in the buffer would depend on the requirements for the maneuver.

In the case of performance degradation without a hard failure, where the sensor modality continues operating but with degraded performance, the health monitoring functional block 200 will issue control signals to the various entities that process the object detection from that sensor modality in order to compensate for the degraded performance. A possible compensation is to give less weight to the sensor modality when detection results from the different modalities are merged. In a specific example, the detection merger functional block 182 will still merge the detection results from the sensor modality with the degraded performance with the other sensor modalities but will attribute less significance to that sensor modality. This approach allows to dynamically change the weight of the different sensor modality detections depending on the driving environment, as naturally, the sensors that operate less efficiently in certain conditions will generate more errors and their inputs are adapted to contribute less to the overall results. Conversely, sensor modalities that operate at great efficiency in that particular driving environment will manifest fewer errors and will become the dominant source of detection results.

A specific example can illustrate this. Consider the situation where the vehicle is being driven during the day. The dominant source of information to perform object detection is the camera as it captures a vast amount of information from the scene around the vehicle. The lidar complements the camera image and by performing raw data fusion a rich 3D map of the environment can be developed. However, during nighttime the camera does not perform as well, and the detection operation based on the camera perception will start to produce more errors. As the amount of light diminishes, the detection error rate produced by the camera sensor will progressively increase and at the same time the reliance on the other sensor modalities will increase in the computation of the final output. In this example, the system will rely more on the lidar sensor because it will manifest less errors than the camera.

The block diagram of FIG. 22 illustrates the time synchronization functionality of the system shown in FIG. 1. Multi-modality and multi sensor time synchronization is required in order to align objects and data inputs which were recorded at different timestamps throughout the operation of the system.

Key challenges in time synchronization:

Detections are made in each sensor/modality asynchronously with a unique time domain, can cause objects to be detected in a different location between the modalities and cause "double detections".

Multiple Sensors and multiple modalities increase the complexity of time synchronization.

The perception system's output timing requirements shall be agnostic to sensors timing constraints.

The system of FIG. 1A is configured such that different modalities operate asynchronously in their own time domains, and they are synchronized to the output time. FIG. 22 shows the system architecture where the different sensor modalities exist in their own time domain. Specifically, each camera has its own time domain aligned to the sensor's frame rate.

Both raw data fusion and Ego-Motion are image based thus they are also synchronized with the camera frame rate. Inputs to raw data fusion from LiDAR and radar time domains are projected to the camera time domain.

For the lidar time domain, All LiDAR points are accumulated asynchronously and projected, using Ego-Motion, to a single lidar detection rate.

For the radar time domain, all radar clusters are accumulated asynchronously and projected, using Ego-Motion, to a single radar detection rate.

The output time domain is asynchronous to the sensors time domain in order to provide a fused perception solution in accordance with system requirements. In order to ensure a solution for time synchronization, a coherent unified timestamp from each sensor and a general timestamp from the ecu must be available to the perception system.

The system of FIG. 1A is configured to perform calibration of the various sensor. The main challenges in multi-sensor calibration are:

Fisheye model of the camera lenses requires complex intrinsic undistortion models Lidar's irregular grid variation requires an intrinsic calibration solution Fusion between different modalities requires accurate extrinsic calibration Accurate calibration is important for detection of small obstacles at a long distance Improved Detection rate Multiple Detections merging Long distance detections\especially small obstacles Multi lidar sensors Point cloud accumulation Calibration drifts over time and requires an online monitoring and/or recalibration Calibration between the sensors and the vehicle Off-line Calibration is a process which handles two different scenarios:

First time manufacturing of entire vehicle

Replacement of sensors on an existing vehicle

Calibration which is performed on a new vehicle will be executed in a designated calibration site which is specially built for instant intrinsic and extrinsic calibration for all sensors simultaneously.

The purpose of this process is to minimize time and cost of self-test and calibration in the manufacturing process.

In case of replacement or re-installment of a sensor—a mobile calibration kit will be developed which will allow for intrinsic and extrinsic calibration of all sensors.

The process illustrated by the flowchart in FIG. 23 is an example of a process to perform calibration.

Online Calibration is a critical aspect of the perception system with direct link to safety requirements. Monitoring of calibration is performed to detect online that any part of the calibration has malfunctioned. In addition, online adjustments are performed in order to allow modifications in the calibration to enable continuous safe driving.

All sensors should be calibrated to a common point relative to AV body. The online calibration process includes aligning all sensors to a certain point of the vehicle, in 6 Degrees of Freedom. This is illustrated at FIG. 24. FIG. 25 is an example of calibration between a lidar point cloud to the image plane of the camera, distance of the lidar point is color-coded (red is near, purple is far) and as can be seen the calibration is accurate. FIGS. 26 and 27 are other examples of calibration targets.

The invention claimed is:

1. A process for sensing a scene containing objects of interest, comprising:

a. receiving sensor data from a first sensor modality, wherein the sensor data conveys information on a portion of the scene and of at least one object of interest;

b. processing the sensor data derived from the first sensor modality to determine a category of the scene based on the sensor data derived from the first sensor modality;

c. selecting an operational mode based on the determined category;

d. configuring a second sensor modality to operate in the selected operational mode;

e. receiving sensor data from the second sensor modality;

f. fusing the sensor data derived from the first sensor modality with the sensor data derived from the second sensor modality to generate a fused three-dimensional (3D) map of the scene;

g. processing the fused 3D map to detect objects of interest in the scene.

2. A process as defined in claim 1, wherein the first sensor modality includes a camera to produce image data describing the portion of the scene.

3. A process as defined in claim 2, wherein the second sensor modality includes a lidar to produce lidar data describing the portion of the scene.

4. A process as defined in claim 3, wherein the image data conveys a plurality of pixels, wherein the lidar data conveys a plurality of distance measurements, the fusing including associating distance values from the lidar data to pixels in the image data.

5. A process as defined in claim 4, wherein the fusing including for first pixels in the image data for which no distance values are available in the lidar data estimating distance values at least in part on the basis of distance values in the lidar data available for second pixels in the image data that are visually similar to the first pixels.

6. A process as defined in claim 5, wherein the camera has a higher resolution than the lidar.

7. A process as defined in claim 6, wherein the fusing includes defining segments in the image data based at least in part on visual similarity of pixels in a segment.

8. A process as defined in claim 7, wherein the fusing defines boundaries of a given segment such as to encompass pixels depicting a portion of the scene with similar colors.

9. A process as defined in claim 7, wherein the fusing identifies three or more distance values in the lidar data associated with pixels in a particular segment and estimates on the basis of the plurality of distance values by using a plane equation, distance values for other pixels in the particular segment for which no distance values are available in the lidar data.

10. A process as defined in claim 1, wherein the second sensor modality includes a radar to produce radar data describing the portion of the scene.

11. A process as defined in claim 1, wherein the fusing further comprises generating an occupancy grid.

12. A process as defined in claim 11, wherein the occupancy grid defines objects of interest and relative positions of the objects of interest.

13. A process as defined in claim 12, wherein the objects of interest include vehicles.

14. A process as defined in claim 13, wherein the occupancy grid identifies a trajectory of individual vehicles.

15. A process as defined in claim 14, wherein the occupancy grid identifies a speed of individual vehicles.

16. A process as defined in claim 15, wherein the occupancy grid defines free space around the vehicles.

17. A process as defined in claim 11, wherein the occupancy grid identifies a motion path of detected objects in 3D space by tracking the detected objects through successive data frames.

18. A process as defined in claim 1, further comprising:

monitoring performance of the first sensor modality and performance of the second sensor modality in the scene respectively;

determining a first weight associated with the first sensor modality based on the monitored performance of the first sensor modality and a second weight associated with the second sensor modality based on the monitored performance of the second sensor modality; and wherein the fusing comprises fusing the sensor data derived from the first sensor modality with the sensor data derived from the second sensor modality based on the first and second weight.

19. A process as defined in claim 1, further comprising:

determining whether the category of the scene changes;

in response to the category of the scene having changed, switching the selected operational mode to another operational mode from a library of operational modes.

20. A system, comprising:

a. a first sensor operating according to a modality, the first sensor configured to observe at least a portion of a scene containing at least one of the objects of interest and to generate sensor data conveying information on the portion of the scene and of the at least one object of interest;

b. a perception functional block for processing the sensor data derived from the first sensor to determine a category of the scene based on the sensor data derived from the first sensor and select an operational mode based on the determined category;

c. a second sensor configured to operate in the selected operational mode and acquire sensor data during the selected operational mode;

d. a sensor fusion module configured for;

i. fusing the sensor data derived from the first sensor with the sensor data derived from the second sensor to generate a fused 3D map of the scene;

ii. processing the fused 3D map to detect objects of interest in the scene.

21. A system as defined in claim 20, wherein the first sensor includes a camera to produce image data describing the portion of the scene.

22. A system as defined in claim 21, wherein the second sensor includes a lidar to produce lidar data describing the portion of the scene.

23. A system as defined in claim 22, wherein the image data conveys a plurality of pixels, wherein the lidar data conveys a plurality of distance measurements, the sensor fusion module configured for associating distance values from the lidar data to pixels in the image data.

24. A system as defined in claim 23, wherein the sensor fusion module is configured for estimating for first pixels in the image data for which no distance values are available in the lidar data, distance values at least in part on the basis of distance values in the lidar data available for second pixels in the image data that are visually similar to the first pixels.

25. A system as defined in claim 24, wherein the camera has a higher resolution than the lidar.

26. A system as defined in claim 25, wherein the sensor fusion module is configured for defining segments in the image data based at least in part on visual similarity of pixels in a segment.

27. A system as defined in claim 26, wherein the sensor fusion module is configured to define boundaries of a given segment to encompass pixels depicting a portion of the scene with similar colors.

28. A system as defined in claim 26, wherein the sensor fusion module is configured for identifying three or more distance values in the lidar data associated with pixels in a particular segment and estimates on the basis of the plurality of distance values by using a plane equation, distance values for other pixels in the particular segment for which no distance values are available in the lidar data.

29. A system as defined in claim 20, wherein the sensor fusion module is configured for generating an occupancy grid.

30. A system as defined in claim 29, wherein the occupancy grid defines objects of interest and relative positions of the objects of interest.

31. A system as defined in claim 30, wherein the objects of interest include vehicles.

32. A system as defined in claim 31, wherein the occupancy grid identifies a trajectory of individual vehicles.

33. A system as defined in claim 31, wherein the occupancy grid identifies a speed of individual vehicles.

34. A system as defined in claim 29, wherein the occupancy grid identifies a motion path of detected objects in 3D space by tracking the detected objects through successive data frames.

* * * * *